(12) United States Patent
Kuang et al.

(10) Patent No.: US 10,743,704 B2
(45) Date of Patent: Aug. 18, 2020

(54) BEVERAGE MACHINE, BREWING METHOD FOR BEVERAGE MACHINE, AND METHOD FOR CONTROLLING BEVERAGE MACHINE

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Jian Kuang, Foshan (CN); Bingchao Liao, Foshan (CN)

(73) Assignees: GUANGDONG MIDEA CONSUMER ELECTRICS MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 286 days.

(21) Appl. No.: 15/907,092

(22) Filed: Feb. 27, 2018

(65) Prior Publication Data

US 2018/0184838 A1 Jul. 5, 2018

Related U.S. Application Data

(63) Continuation of application No. PCT/CN2016/083950, filed on May 30, 2016.

(30) Foreign Application Priority Data

Mar. 21, 2016 (CN) .......................... 2016 1 0166120
Mar. 21, 2016 (CN) ..................... 2016 2 0221647 U

(51) Int. Cl.
*A47J 31/00* (2006.01)
*A47J 31/06* (2006.01)
(Continued)

(52) U.S. Cl.
CPC ......... *A47J 31/0673* (2013.01); *A47J 31/106* (2013.01); *A47J 31/24* (2013.01)

(58) Field of Classification Search
CPC ........... A47J 31/24; A47J 31/10; A47J 31/106
(Continued)

(56) References Cited

U.S. PATENT DOCUMENTS 2,881,692 A * 4/1959 Volcov ................ A47J 31/0573
99/283
4,867,048 A * 9/1989 Brewer ................ A47J 31/002
99/283

(Continued)

FOREIGN PATENT DOCUMENTS

CN 203378971 U 1/2014
CN 203802265 U 9/2014
(Continued)

OTHER PUBLICATIONS

Midea, International Search Report and Written Opinion, PCT/CN2016/072147, dated Jan. 9, 2017, 16 pgs.

*Primary Examiner* — Reginald Alexander
(74) *Attorney, Agent, or Firm* — Morgan, Lewis & Bockius LLP

(57) ABSTRACT

Provided are a beverage machine and a method for controlling the beverage machine. The beverage machine comprises: a machine body, a brewing mechanism, a frame, a boiler, a liquid pump, and a power supply board. The machine body further comprises a machine head, a body, and a base, connected in sequence from top to bottom; the brewing mechanism is detachably disposed on the machine head, and the brewing mechanism is provided with a brewing chamber; the frame is disposed within the body; the boiler, liquid pump, and power supply board are disposed on the frame; the boiler is connected to the brewing chamber, and the interior of the boiler is in communication with the external atmosphere; the liquid pump is connected between the boiler and the brewing chamber.

19 Claims, 16 Drawing Sheets

(51) Int. Cl.
*A47J 31/10* (2006.01)
*A47J 31/24* (2006.01)

(58) Field of Classification Search
USPC .............................................. 99/307, 302 R
See application file for complete search history.

(56) References Cited

U.S. PATENT DOCUMENTS

| | | | | |
|---|---|---|---|---|
| 5,392,694 | A * | 2/1995 | Muller | A47J 31/36 |
| | | | | 99/295 |
| 7,165,488 | B2 * | 1/2007 | Bragg | A47J 31/0673 |
| | | | | 99/295 |
| 8,573,116 | B2 * | 11/2013 | Etter | A47J 31/441 |
| | | | | 99/288 |
| 8,590,443 | B2 * | 11/2013 | Mahlich | A47J 31/4492 |
| | | | | 99/290 |
| 9,247,846 | B2 * | 2/2016 | Glucksman | A47J 31/057 |
| 2013/0186282 | A1 * | 7/2013 | Guo | A47J 31/3638 |
| | | | | 99/295 |
| 2015/0359377 | A1 * | 12/2015 | Graham | A47J 31/4467 |
| | | | | 99/283 |
| 2016/0150911 | A1 * | 6/2016 | Upston | A47J 31/46 |
| | | | | 99/285 |

FOREIGN PATENT DOCUMENTS

| | | |
|---|---|---|
| CN | 203907977 U | 10/2014 |
| CN | 104997403 A | 10/2015 |
| JP | 2001238799 A | 9/2001 |

* cited by examiner

BEVERAGE MACHINE, BREWING METHOD FOR BEVERAGE MACHINE, AND METHOD FOR CONTROLLING BEVERAGE MACHINE

PRIORITY CLAIM AND RELATED APPLICATION

This application is a continuation application of PCT/CN2016/083950, entitled "BEVERAGE MACHINE, BREWING METHOD FOR BEVERAGE MACHINE, AND METHOD FOR CONTROLLING BEVERAGE MACHINE" filed on May 30, 2016, which claims priority to (i) Chinese Patent Application No. 201610166120.8, filed with the State Intellectual Property Office of the People's Republic of China on Mar. 21, 2016, and (ii) Chinese Patent Application No. 201620221647.1, filed with the State Intellectual Property Office of the People's Republic of China on Mar. 21, 2016, all of which are incorporated herein by reference in their entirety.

TECHNICAL FIELD

The present disclosure relates to a technical field of beverage brewage, and more particularly to a beverage machine, a brewing method for a beverage machine, and a method for controlling a beverage machine.

BACKGROUND

In the related art, a heating device in a beverage machine is usually a sealed container, and hot water in the sealed container is conveyed to a brewing device by means of pressure, so as to achieve an effect of beverage brewage. However, a safety hazard exists in a process of heating the sealed container. Additionally, the beverage machine has a large volume and unreasonable spatial layout, and is not convenient to use.

SUMMARY

Embodiments of the present disclosure seek to solve at least one of the problems existing in the related art to at least some extent. For that reason, an objective of the present disclosure is to provide a beverage machine that has a small volume and high safety.

Another objective of the present disclosure is to provide a brewing method for a beverage machine.

Another objective of the present disclosure is to provide a method for controlling a beverage machine.

The beverage machine according to a first aspect of the present disclosure includes: a machine body, including a machine nose, a main body, and a base, connected in sequence from top to bottom; a brewing mechanism, detachably disposed to the machine nose and having a brewing cavity; a frame, disposed in the main body; a boiler, disposed to the frame, connected to the brewing cavity, and having an interior in communication with the external atmosphere; a liquid pump, disposed to the frame and connected between the boiler and the brewing cavity; and a power supply board, disposed to the frame.

For the beverage machine according to embodiments of the present disclosure, the boiler, the liquid pump and the power supply board are integrally mounted and fixed to the frame, such that the spatial layout of the beverage machine becomes reasonable, the structure of the beverage machine is compact, thereby reducing the overall volume of the beverage machine, and saving the space occupied by the beverage machine. In addition, the boiler, the liquid pump and the power supply board can be mounted and detected independently, thereby improving manufacturability and detectability of the beverage machine.

According to some embodiments of the present disclosure, the machine nose is provided with a liquid communication path and a safety switch, the liquid communication path being communicated with the interior of the boiler; the brewing mechanism is provided with a liquid supply joint, and the liquid supply joint is communicated with the brewing cavity; when the brewing mechanism is mounted to the machine nose, the liquid supply joint is communicated with the liquid communication path, and the safety switch is triggered.

Specifically, a top of the boiler is open, and the machine nose is provided with a boiler cover, the boiler cover being located at the top of the boiler.

According to some embodiments of the present disclosure, the frame includes: a first frame, the boiler being supported on the first frame; and a second frame connected below the first frame, the liquid pump and the power supply board being both disposed on the second frame.

Further, the first frame internally defines an accommodating cavity with an open top, a top of the boiler is provided with a turn-up extending outwards, and the boiler is disposed within the accommodating cavity and the turn-up is supported on a top of the first frame.

Specifically, the top of the first frame is provided with a frame turn-up extending outwards, the turn-up of the boiler is supported on an upper surface of the frame turn-up, the frame turn-up extends outwards beyond the turn-up of the boiler, and a distance between an outer edge of the frame turn-up and an edge of the turn-up of the boiler is A that satisfies $8 \text{ mm} \leq A \leq 12 \text{ mm}$.

Further, a thermistor is provided to a side of the boiler, an inner wall of the accommodating cavity defines a limiting groove for accommodating the thermistor, and the limiting groove penetrates an upper end face of the first frame.

Specifically, a cross-sectional area of a periphery of the second frame is larger than a cross-sectional area of a periphery of the first frame, to form a step between the first frame and the second frame; a bottom of the boiler stretches downwardly into the second frame; and a distance between an edge of the bottom of the boiler and a bottom surface of the step is B that satisfies $B \geq 7 \text{ mm}$.

Further, the power supply board is connected to the second frame through at least one snap structure. Each snap structure includes: a snap provided to a bottom of the second frame and extending downwards; and a snapping groove provided in a bottom surface of the power supply board, the snap being fitted with the snapping groove to connect the power supply board to the second frame.

Further, one of the second frame and the power supply board is provided with a positioning rib, and the other one of the second frame and the power supply board is provided with a positioning groove fitted with the positioning rib; the power supply board is moved from the bottom up relative to the second frame, such that the positioning rib is fitted with the positioning groove and the snap is fitted with the snapping groove.

Further, a heating device is provided to a bottom of the boiler, and a minimum distance between the heating device and the power supply board is C that satisfies $20 \text{ mm} \leq C \leq 35 \text{ mm}$.

Specifically, the brewing mechanism includes: a brewing body having an open top; a needle disc disposed to a lower portion in the brewing body and provided with a first piercing needle; and a brewing cover pivotably disposed to the top of the brewing body and provided with a second piercing needle, a brewing cavity being defined between the brewing cover and the brewing body.

According to some embodiments of the present disclosure, a distance between an upper surface of the brewing body and a bottom of the brewing body is M, a diameter of a cup rim of the brewing body is Y, and a ratio relationship between M and Y is $0.91 \leq M/Y \leq 1.56$.

Specifically, E satisfies 55 mm$\leq$E$\leq$70 mm, and Y satisfies 40 mm$\leq$Y$\leq$60 mm.

Further, a side of the brewing body is provided with a grip portion, the grip portion extends upwards beyond an upper end face of the brewing body, and a distance between two ends of the grip portion is G that satisfies 75 mm$\leq$G$\leq$85 mm.

Optionally, a distance between two ends of the brewing body connected to the grip portion is V that satisfies 62 mm$\leq$V$\leq$70 mm.

According to some embodiments of the present disclosure, a top of the grip portion is higher than the brewing cover by a distance U, and U satisfies 5 mm$\leq$U$\leq$10 mm.

Specifically, a distance between a central axis of the second piercing needle and an outer side surface of the grip portion is Q that satisfies 35 mm$\leq$Q$\leq$45 mm.

Optionally, a distance between an upper surface of the brewing cover and the upper surface of the brewing body is N that satisfies 8 mm$\leq$N$\leq$13 mm.

Specifically, the brewing cover is pivotably disposed to the brewing body through a pivot shaft, and a distance between a central axis of the pivot shaft and the central axis of the second piercing needle is P that satisfies 35 mm$\leq$P$\leq$45 mm.

Further, the boil is provided with a first liquid outlet, a cross section of the boiler is circular, an outer diameter of the boiler is R, a height of the boiler is h, and a ratio relationship between h and R is $0.5 \leq h/R \leq 0.88$.

According to some embodiments of the present disclosure, R further satisfies 80 mm$\leq$R$\leq$100 mm, and h further satisfies 50 mm$\leq$h$\leq$70 mm.

Specifically, an inclination angle of a bottom wall of the boiler with respect to an upper surface of the boiler is $\alpha$ that satisfies $5° \leq \alpha \leq 10°$.

Optionally, the boiler is provided with a thermistor, the thermistor has an end stretching into the boiler and is disposed horizontally, and a distance between a central axis of the thermistor and an outer edge of the bottom of the boiler is J that satisfies 10 mm$\leq$J$\leq$20 mm.

Further, an inner wall of the boiler has a first water level line higher than the thermistor.

Optionally, a distance between the first water level line and an upper end face of the boiler is E that satisfies 10 mm$\leq$E$\leq$20 mm.

Specifically, the turn-up of the boiler has a width W that satisfies 2.5 mm$\leq$W$\leq$4.5 mm.

According to some embodiments of the present disclosure, a distance between a lower end face of the brewing mechanism and an upper surface of the base is L1 that satisfies 110 mm$\leq$L1$\leq$180 mm.

According to some embodiments of the present disclosure, a distance between a lower end face of the brewing mechanism and an upper end face of the machine nose is L2 that satisfies 95 mm$\leq$L2$\leq$110 mm.

Specifically, the main body is formed in a cylindrical shape, and an outer diameter of the main body is D that satisfies 125 mm$\leq$D$\leq$140 mm.

According to some embodiments of the present disclosure, a height of the machine body is H that satisfies 230 mm$\leq$H$\leq$295 mm.

Specifically, a length of the machine body is L3 that satisfies 225 mm$\leq$L3$\leq$240 mm.

Regarding the brewing method for the beverage machine according to embodiments of a second aspect of the present disclosure, the beverage machine includes a machine body, a brewing mechanism, a frame, a boiler, a liquid pump and a power supply board; the machine body includes a machine nose, a main body, and a base, connected in sequence from top to bottom; the brewing mechanism is detachably disposed to the machine nose, and includes a brewing body having an open top, a needle disc disposed to a lower portion in the brewing body and provided with a first piercing needle, and a brewing cover pivotably disposed to the top of the brewing body and provided with a second piercing needle, a brewing cavity being defined between the brewing cover and the brewing body; the frame is disposed in the main body, and includes a first frame and a second frame connected below the first frame; the boiler is supported on the first frame and connected to the brewing cavity, and has an interior in communication with the external atmosphere; the liquid pump and the power supply board are both disposed on the second frame, and the liquid pump is connected between the boiler and the brewing cavity.

The brewing method includes the following steps: putting a beverage capsule into the brewing cavity; closing the brewing cover and piercing a top of the beverage capsule first by the second piercing needle of the brewing cover; piercing a bottom of the beverage capsule by the first piercing needle of the needle disc; pushing the brewing mechanism into the beverage machine, and detecting, by the beverage machine, whether the brewing mechanism is installed in place.

The method for controlling the beverage machine according to embodiments of a third aspect of the present disclosure includes the following steps: detecting whether liquid in a boiler reaches a preset temperature; pumping water to a brewing cavity by a liquid pump when the liquid in the boiler has reached the preset temperature; and keeping the liquid pump working for a period of time t2 until the end of brewing work, when a water level in the boiler reaches a water level detected by a liquid level sensor.

Specifically, t2 satisfies 20 s$\leq$t2$\leq$30 s.

Optionally, the boiler heats the liquid in the boiler by means of a heating device; after the heating device heats the liquid in the boiler up to the preset temperature, the heating device stops working, and after a first preset time t1, the liquid pump is started.

Specifically, the first preset time t1 satisfies 5 s$\leq$t1$\leq$10 s.

According to some embodiments of the present disclosure, the working time of the heating device is t3, and t3 satisfies t3$\leq$120 s.

Further, before starting the heating device, the method further includes: detecting whether a liquid level in the boiler reaches a preset liquid level; and detecting whether a brewing mechanism is installed in place.

Optionally, the method includes: detecting whether the liquid level in the boiler reaches the preset liquid level after detecting whether the brewing mechanism is installed in place.

Specifically, the time required for the liquid pump to convey all the liquid in the boiler to the brewing cavity is t4, and t4 satisfies 35 s$\leq$t4$\leq$60 s.

Optionally, the preset temperature is T, and T satisfies 80° C.$\leq$T$\leq$90° C.

According to some embodiments of the present disclosure, the beverage machine further includes a timer provided to the beverage machine and a snap-action thermostat provided to the boiler; the method further includes: controlling the beverage machine to be powered off when the liquid in the boiler reaches the preset temperature T; or controlling the beverage machine to be powered off by means of the snap-action thermostat, when the thermistor fails and the temperature of the boiler reaches a temperature point of the snap-action thermostat; or controlling the beverage machine to be powered off, when the thermistor and the snap-action thermostat both fail, and the timer starts counting from the time of heating and counts to t5.

Specifically, t5 satisfies $120 \text{ s} \leq t5 \leq 180 \text{ s}$.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
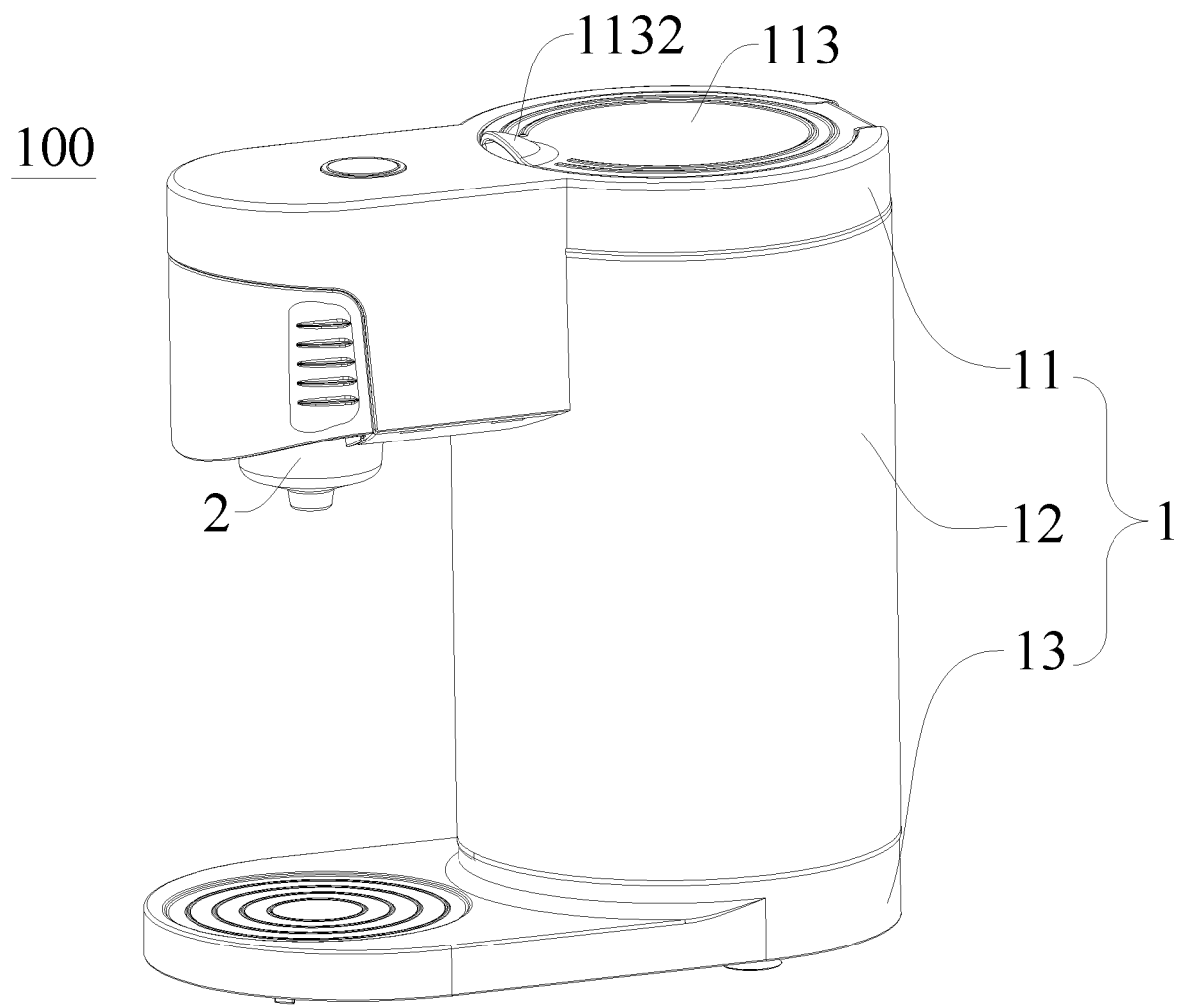
FIG. 1 is a perspective view of a beverage machine according to embodiments of the present disclosure.

REFERENCE NUMERALS beverage machine 100;

machine body 1, machine nose 11, liquid communication path 111, safety switch 112, boiler cover 113, first pivot shaft 1131, buckle 1132, first pivot hole 114, main body 12, base 13, second nut column 131;

brewing mechanism 2, brewing body 21, second pivot hole 211, second annular retaining rib 212, grip portion 213, second liquid outlet 214, brewing cover 22, second pivot shaft 221, second piercing needle 222, first annular retaining rib 223, liquid inlet 224, blocking plug 225, needle disc 23, first piercing needle 231, brewing cavity 24, sealing member 25, liquid supply joint 26, second seal ring 261;

boiler 3, first liquid outlet 31, recessed groove 32, thermistor 33, first seal ring 34, first water level line 35, second water level line 36, fuse 37, snap-action thermostat 38, turn-up 39;

frame 4, first frame 41, second frame 42, positioning groove 421, accommodating cavity 43, frame turn-up 431, limiting groove 44, step 45, snap 46, fixing structure 47, recess 48, limiting portion 481, first nut column 491, second screw 492;

liquid pump 5, liquid inlet pipe 51, liquid outlet pipe 52;

power supply board 6, retaining rib 61, snapping groove 62, positioning rib 63;

heating device 7;

aluminum plate 8.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central", "lower", "upper", "front", "rear", "right", "left", "horizontal", "vertical", "top", "bottom", "inner", "outer" and the like should be construed to refer to the orientation as then described or as shown in the drawings under discussion. These relative terms are for convenience of description and do not require that the present invention be constructed or operated in a particular orientation. Thus, these terms are not constructed to limit the present disclosure.

It should be noted that terms such as "first" and "second" are used herein for purposes of description and are not intended to indicate or imply relative importance or significance or to imply the number of indicated technical features. Thus, the feature defined with "first" and "second" may comprise one or more of this feature. Further, in the description of the present invention, "a plurality of" means two or more than two, unless specified otherwise.

A beverage machine 100 according to embodiments of a first aspect of the present disclosure will be described below with reference to FIGS. 1-19. The beverage machine 100 can be a coffee machine. In the following description, the coffee machine is elaborated as an example of the beverage machine 100.

Figure 2:
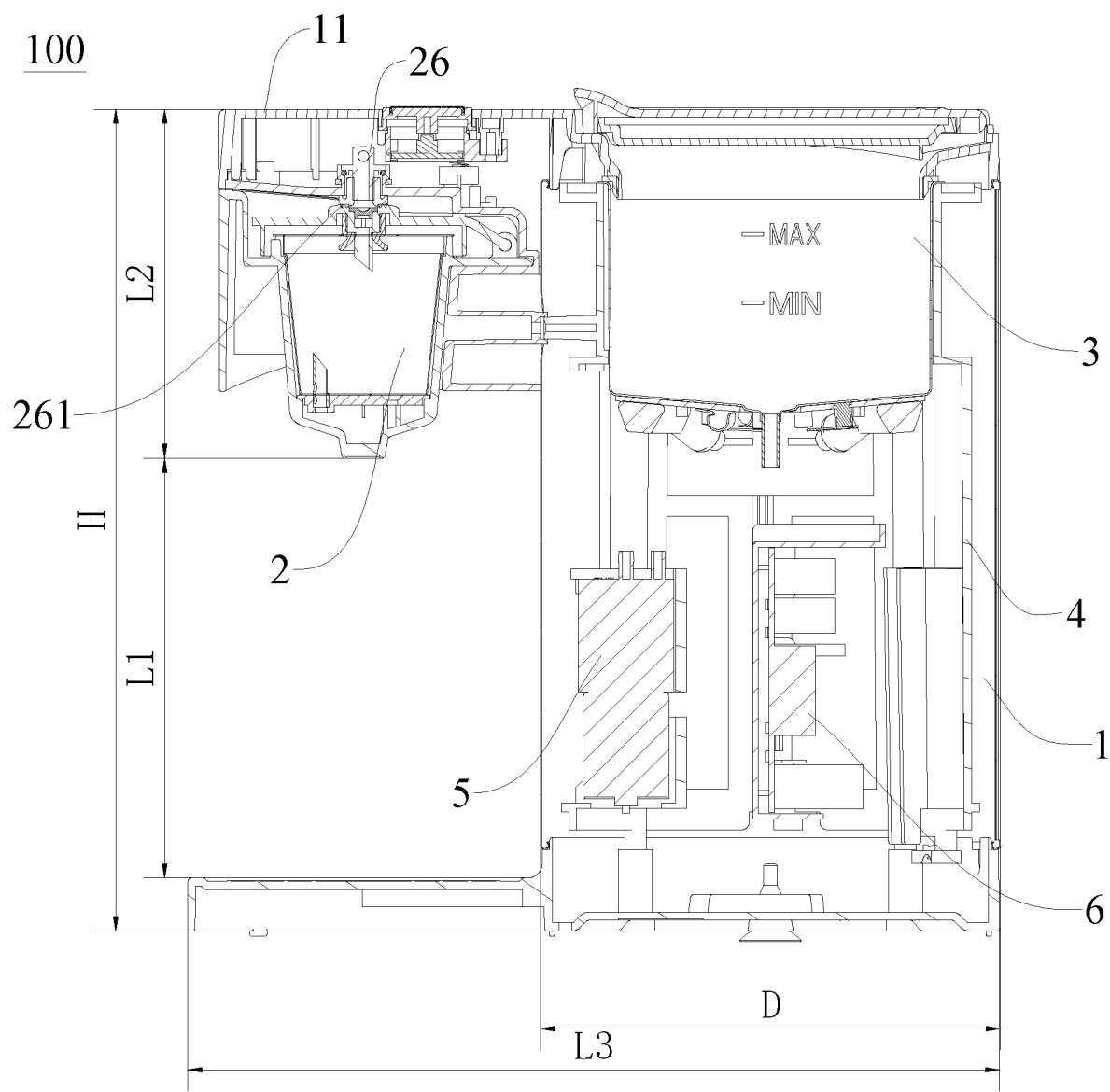
FIG. 2 is a sectional view of the beverage machine in FIG. 1.
Figure 3:
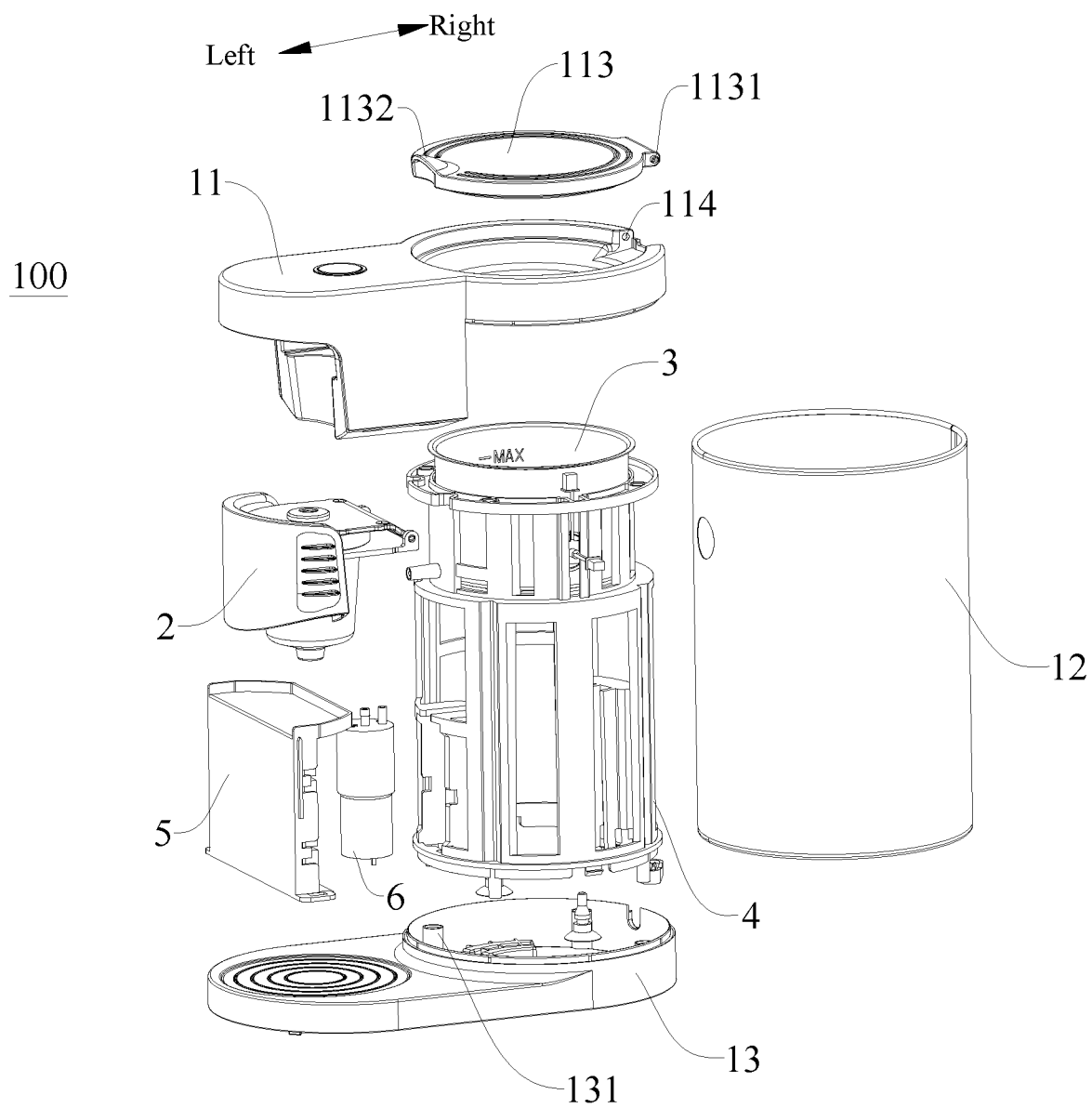
FIG. 3 is an exploded view of the beverage machine in FIG. 1.

As shown in FIGS. 1-3, the beverage machine 100 according to embodiments of the first aspect of the present disclosure includes a machine body 1, a brewing mechanism 2, a frame 4, a boiler 3, a liquid pump 5 and a power supply board 6.

Referring to FIG. 2, the machine body 1 includes a machine nose 11, a main body 12, and a base 13, connected in sequence from top to bottom. Optionally, the machine body 1 can be, but not limited to, a plastic part or a metal part.

Figure 9:
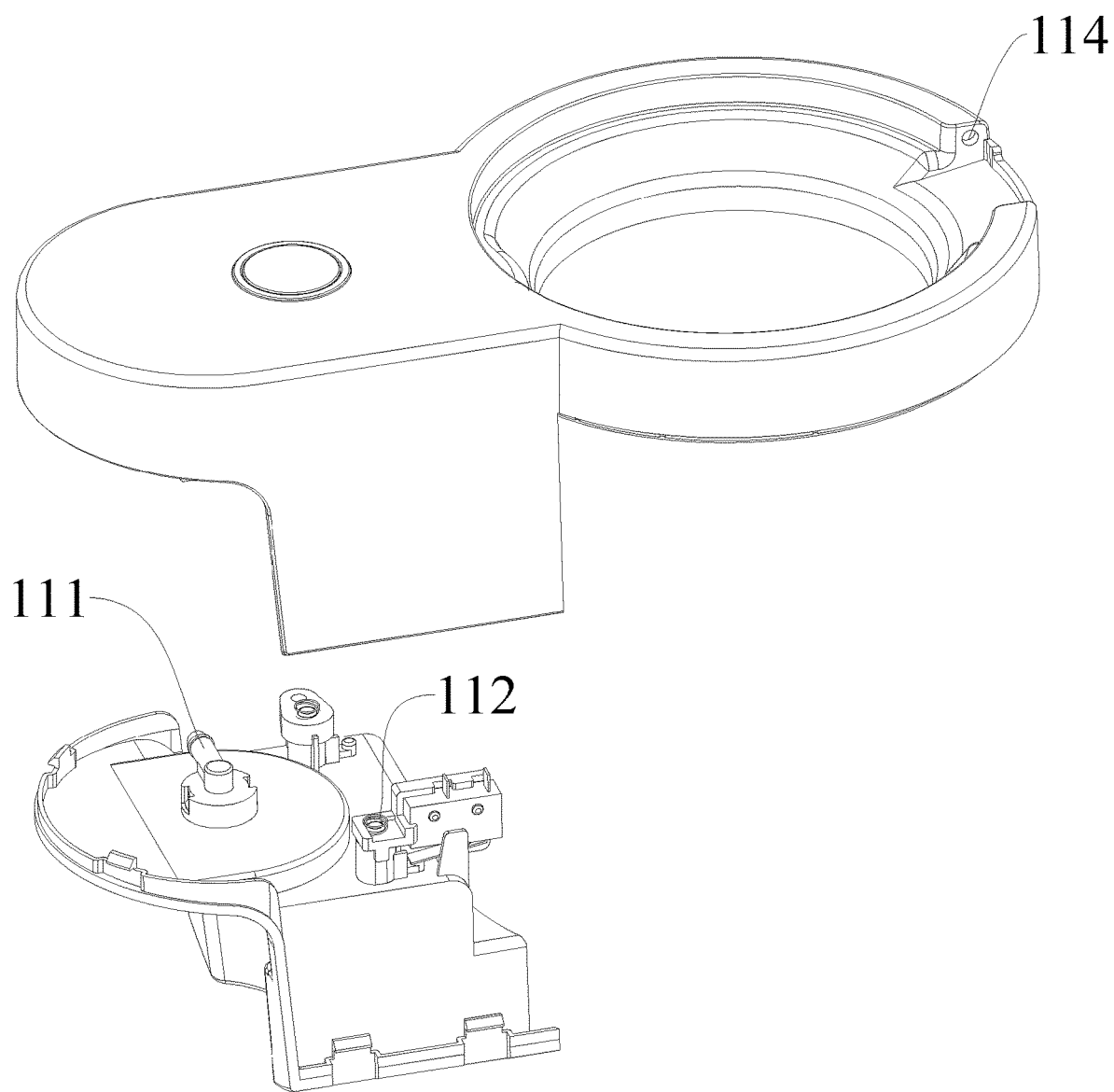
FIG. 9 is an exploded view of a machine nose in FIG. 3.

The brewing mechanism 2 is detachably disposed to the machine nose 11. Referring to FIGS. 1 and 9, a left side of the machine nose 11 defines a hollow accommodating portion, and the brewing mechanism 2 can be mounted in the accommodating portion through a screw or a snap 46, but the situation is not limited thereto. Therefore, after completion of the use, the brewing mechanism 2 can be removed from the machine nose 11 to be cleaned, which reduces difficulty of cleaning the brewing mechanism 2 and saves cleaning time.

The brewing mechanism 2 has a brewing cavity 24, and a beverage capsule (like a coffee capsule) can be placed in the brewing cavity 24.

The frame 4 is disposed in the main body 12, and the boiler 3 is disposed to the frame 4. The boiler 3 is connected to the brewing cavity 24, and an interior of the boiler 3 is in communication with the external atmosphere. For example, referring to FIGS. 4 and 13, a top of the boiler 3 is designed to be open, so as to reduce a safety hazard and improve safety of the beverage machine 100.

The liquid pump 5 (e.g. a water pump) and the power supply board 6 are disposed to the frame 4. Specifically, referring to FIG. 4, the frame 4 forms a hollow structure, and the boiler 3, the liquid pump 5 and the power supply board 6 are all provided in an internal space of the frame 4. Since the boiler 3, the liquid pump 5 and the power supply board 6 are integrally mounted and fixed to the frame 4, a spatial layout of the beverage machine 100 becomes reasonable, a structure of the beverage machine 100 is compact, and hence an overall volume of the beverage machine 100 is reduced, thereby saving the space occupied by the beverage machine 100.

The liquid pump 5 is connected between the boiler 3 and the brewing cavity 24. For example, referring to FIGS. 5 and 18, a bottom of the boiler 3 is provided with a first liquid outlet 31, and a top of the liquid pump 5 is provided with a liquid inlet pipe 51 and a liquid outlet pipe 52. The liquid inlet pipe 51 is connected to the first liquid outlet 31, and the liquid outlet pipe 52 is connected to the brewing cavity 24, such that liquid in the boiler 3 can be conveniently conveyed to the brewing cavity 24 by the liquid pump 5.

For the beverage machine 100 according to embodiments of the present disclosure, the boiler 3, the liquid pump 5 and the power supply board 6 are integrally mounted and fixed to the frame 4, such that the spatial layout of the beverage machine 100 becomes reasonable, the structure of the beverage machine 100 is compact, and hence the overall volume of the beverage machine 100 is reduced, saving the space occupied by the beverage machine 100. In addition, the boiler 3, the liquid pump 5 and the power supply board 6 can be mounted and detected independently, thereby improving manufacturability and detectability of the beverage machine 100.

According to some embodiments of the present disclosure, referring to FIG. 9, the machine nose 11 is provided with a liquid communication path 111 and a safety switch 112. The liquid communication path 111 is communicated with the interior of the boiler 3, the brewing mechanism 2 is provided with a liquid supply joint 26, and the liquid supply joint 26 is communicated with the brewing cavity 24. The communication between the liquid communication path 111 and the interior of the boiler 3, the communication between the liquid supply joint 26 and the brewing cavity 24, and the communication between the liquid supply joint 26 and the liquid communication path 111 can be respectively achieved by means of a silicone tube. When the brewing mechanism 2 is mounted to the machine nose 11, the liquid supply joint 26 is communicated with the liquid communication path 111, and the safety switch 112 is triggered.

That is, the safety switch 112 can be triggered only when the brewing mechanism 2 is installed in place, and thus the beverage machine 100 can be powered on and continue brewing a beverage, like coffee. When the brewing mechanism 2 is deviated from the correct position, the safety switch 112 cannot be triggered, and the beverage machine 100 is not powered on and is unable to continue working, in which case an error message can be set to remind a user to adjust the position of the brewing mechanism 2. For example, the beverage machine 100 can be provided with an indicator lamp, and the indicator lamp is set to regularly flicker rapidly at 200 ms when the error message occurs, so as to remind the user to adjust the position of the brewing mechanism 2. Therefore, the beverage machine 100 can be prevented from working in the case where the brewing mechanism 2 is deviated, so as to reduce the safety hazard effectively and further improve the safety and reliability of the beverage machine 100.

Specifically, the top of the boiler 3 is open, and the machine nose 11 is provided with a boiler cover 113, the boiler cover 113 being located at the top of the boiler 3. The boiler cover 113 can be opened manually or automatically, such that boiler cover 113 can cover the boiler 3 to prevent dust and the like from falling into the boiler 3 and prevent the liquid in the boiler 3 from splashing out, thereby enhancing the safety of the beverage machine 100.

Optionally, the boiler cover 113 is pivotably connected to the machine body 1. For example, the boiler cover 113 can be connected to the machine body 1 through a pivotal mechanism. Referring to FIG. 3, a first end (e.g. a right end in FIG. 3) of the boiler cover 113 can be provided with a first pivot shaft 1131, and correspondingly, the machine nose 11 can be provided with a first pivot hole 114 fitted with the first pivot shaft 1131. A second end (e.g. a left end in FIG. 3) of the boiler cover 113 can open or close the boiler 3 cooperatively.

Figure 4:
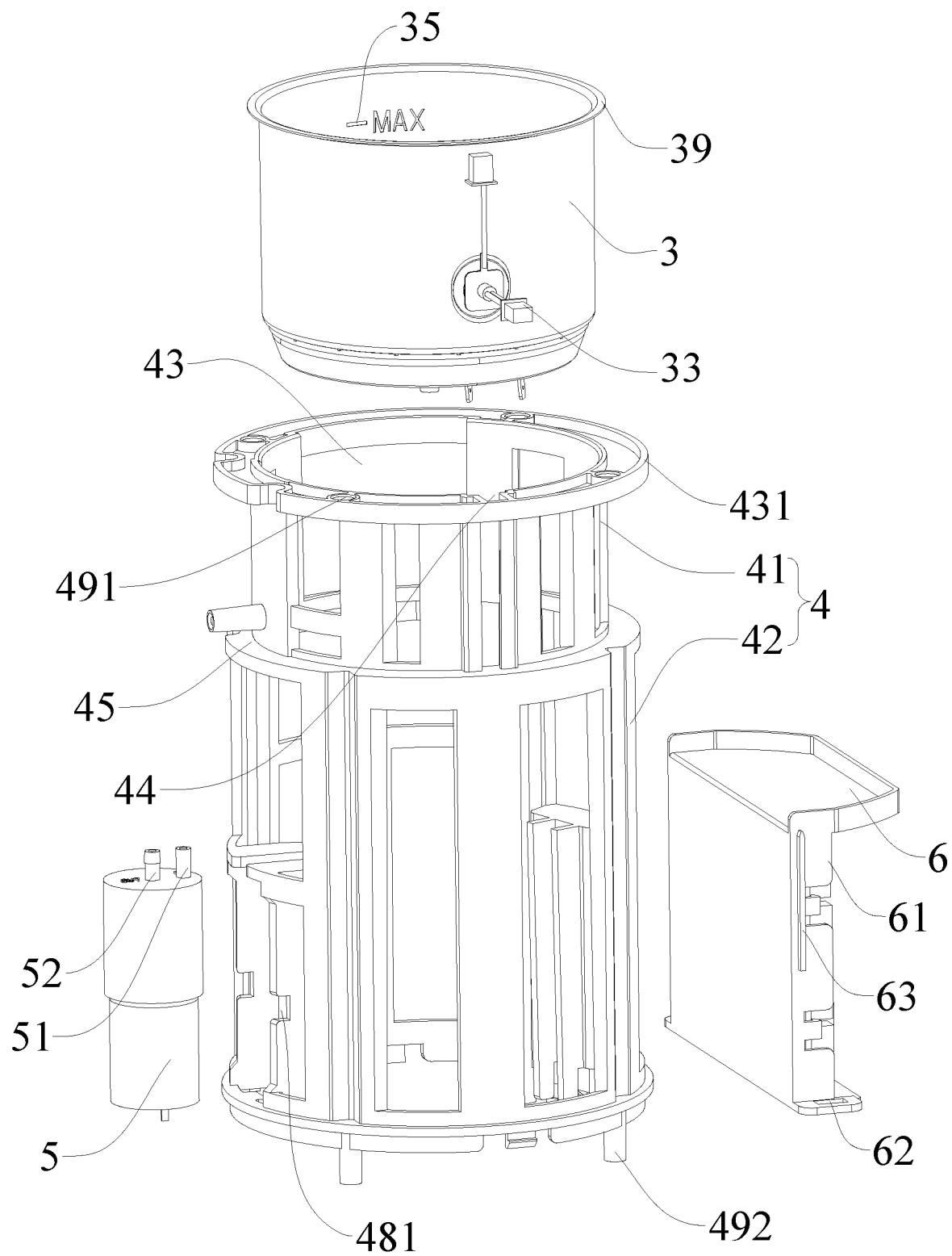
FIG. 4 is an exploded view of a frame, a boiler, a liquid pump and a power supply board in FIG. 3.

Further, the boiler cover 113 is provided with a buckle 1132. Referring to FIG. 4, the buckle 1132 is provided to the second end of the boiler cover 113, a side of the buckle 1132 adjacent to the machine nose 11 has an opening, and an upper end face of the buckle 1132 is higher than an upper end face of the machine nose 11. Thus, the user can grip the buckle 1132 to open the boiler cover 113 conveniently, so as to facilitate water injection into the boiler 3.

According to some embodiments of the present disclosure, the frame 4 includes a first frame 41 and a second frame 42, in which the boiler 3 is supported on the first frame 41. For example, referring to FIG. 4, the first frame 41 internally defines an accommodating cavity 43 with an open top, the top of the boiler 3 is provided with a turn-up 39 extending outwards, and the boiler 3 is disposed within the accommodating cavity 43 and the turn-up 39 of the boiler 3 is supported on a top of the first frame 41. Thus, the position of the boiler 3 can become stable.

Specifically, the turn-up 39 of the boiler 3 has a width W that satisfies 2.5 mm≤W≤4.5 mm. In some embodiments, W further satisfies W=3 mm. Thus, the structural strength of the boiler 3 can be enhanced and materials can be saved. Additionally, the appearance of the boiler 3 can be effectively improved.

The second frame 42 is connected below the first frame 41, and the liquid pump 5 and the power supply board 6 are both disposed on the second frame 42. The first frame 41 and the second frame 42 can be integrally molded, which can improve the structural strength of the frame 4 and make the processing simple and convenient.

Optionally, the frame 4 can be a plastic part, and the main body 12 can be a metal part, but the situation is not limited thereto. By configuring the frame 4 as the plastic part, it can play a great role of thermal insulation to prevent scalds, and additionally, material costs of the frame 4 can be lowered, thereby reducing overall costs of the beverage machine 100. Since the frame 4 is cladded with the metal part, an exterior of the beverage machine 100 is easy to clean, and is anti-pollution, anti-tarnish and durable.

Figure 5:
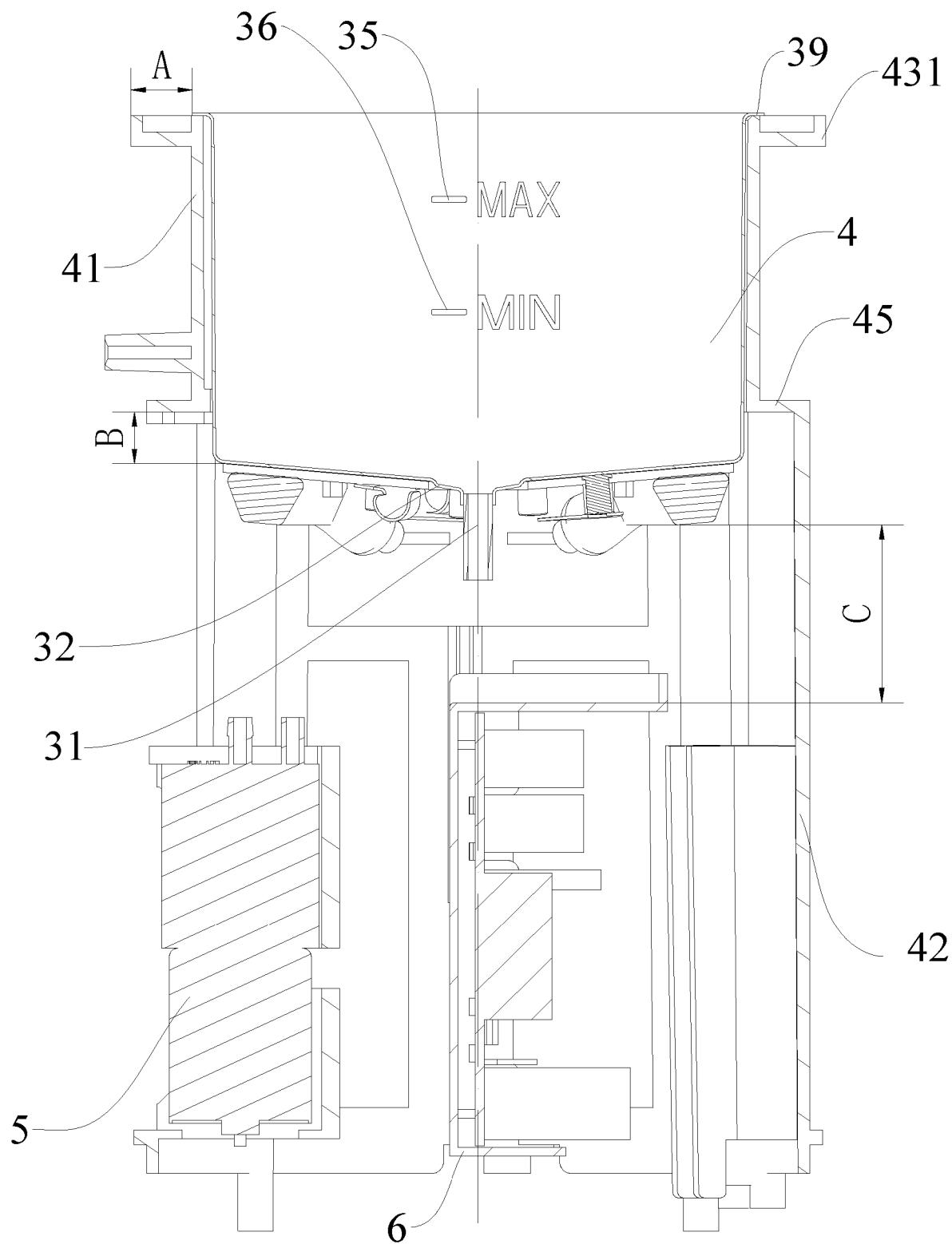
FIG. 5 is a sectional view of the frame, the boiler, the liquid pump and the power supply board in FIG. 4.
Figure 6:
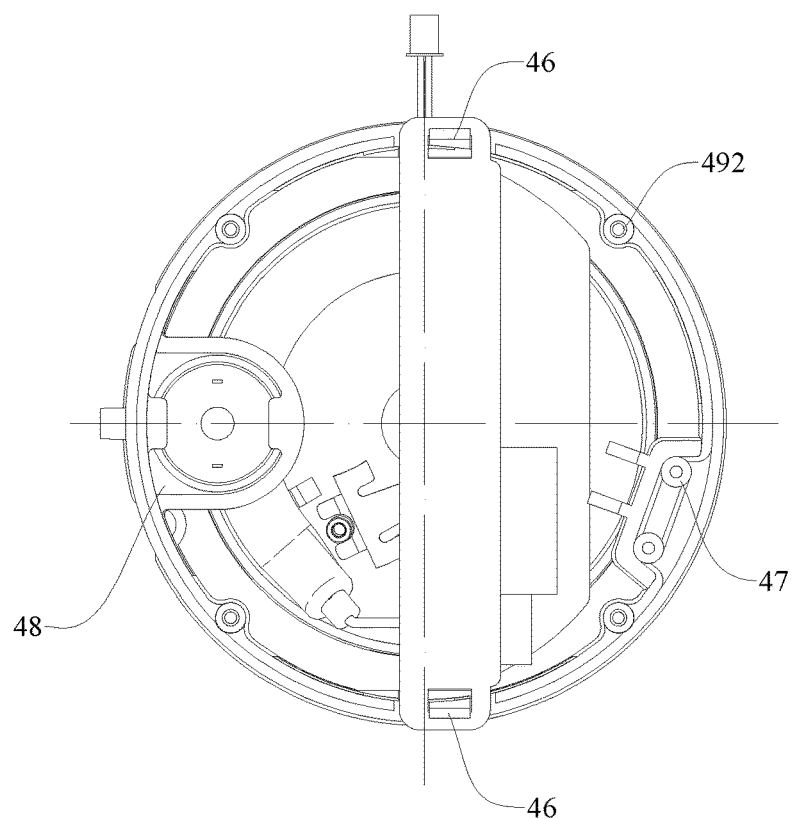
FIG. 6 is a bottom view of the frame, the boiler, the liquid pump and the power supply board in FIG. 4.

Further, referring to FIG. 5, the top of the first frame 41 is provided with a frame turn-up 431 extending outwards, and the turn-up 39 of the boiler 3 is supported on an upper surface of the frame turn-up 431. Thus, pressure between the boiler 3 and the first frame 41 can be effectively reduced, thus lowering material and processing requirements of the first frame 41, thereby further saving material costs and processing costs.

According to some embodiments of the present disclosure, referring to FIG. 5, the frame turn-up 431 extends outwards beyond the turn-up 39 of the boiler 3, and a distance A between an outer edge of the frame turn-up 431 and an edge of the turn-up 39 of the boiler 3 satisfies 8 mm≤A≤12 mm. A specific value of the distance A can be determined in the light of practical requirements. For example, A can further satisfy A=10.5 mm. Therefore, the pressure between the boiler 3 and the first frame 41 can be effectively reduced, and the position of the boiler 3 can become more stable.

Further, the bottom of the boiler 3 is provided with a heating device 7, so as to heat liquid (e.g. water) in the boiler 3. Optionally, the heating device 7 can be but not limited to a heat radiating tube, a heating tube or the like. The heating device 7 can be connected to an outer surface of the bottom of the boiler 3 through an aluminum plate 8. For example, the heat radiating tube and the aluminum plate 8 can be connected to and integrated with a bottom surface of the boiler 3 by a welding process. Hence, it is possible to improve a heat conducting effect and enhance heating efficiency, and the process is simple and easy to achieve.

Figure 16:
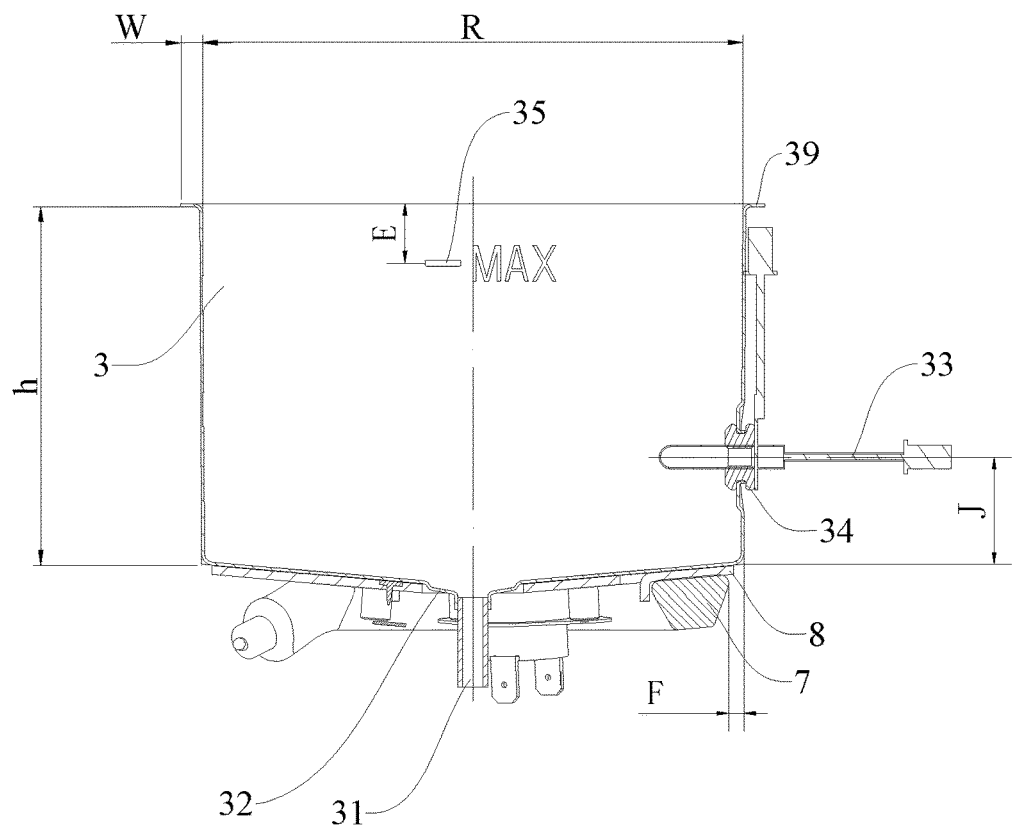
FIG. 16 is another sectional view of the boiler in FIG. 14.
Figure 17:
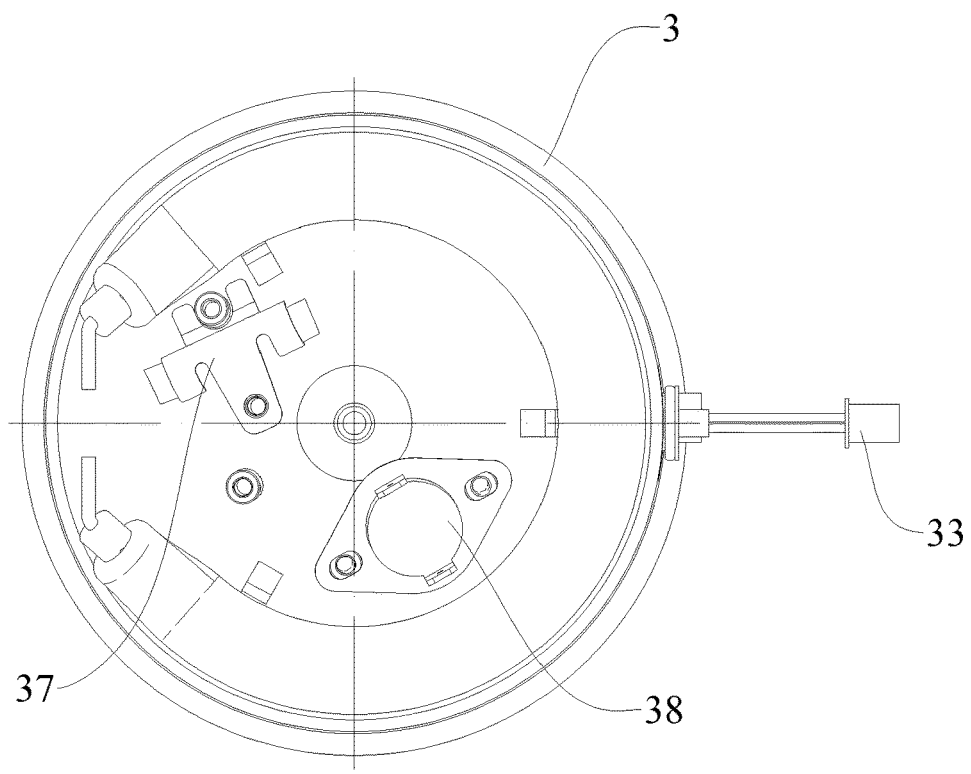
FIG. 17 is a bottom view of the boiler in FIG. 14.
Figure 18:
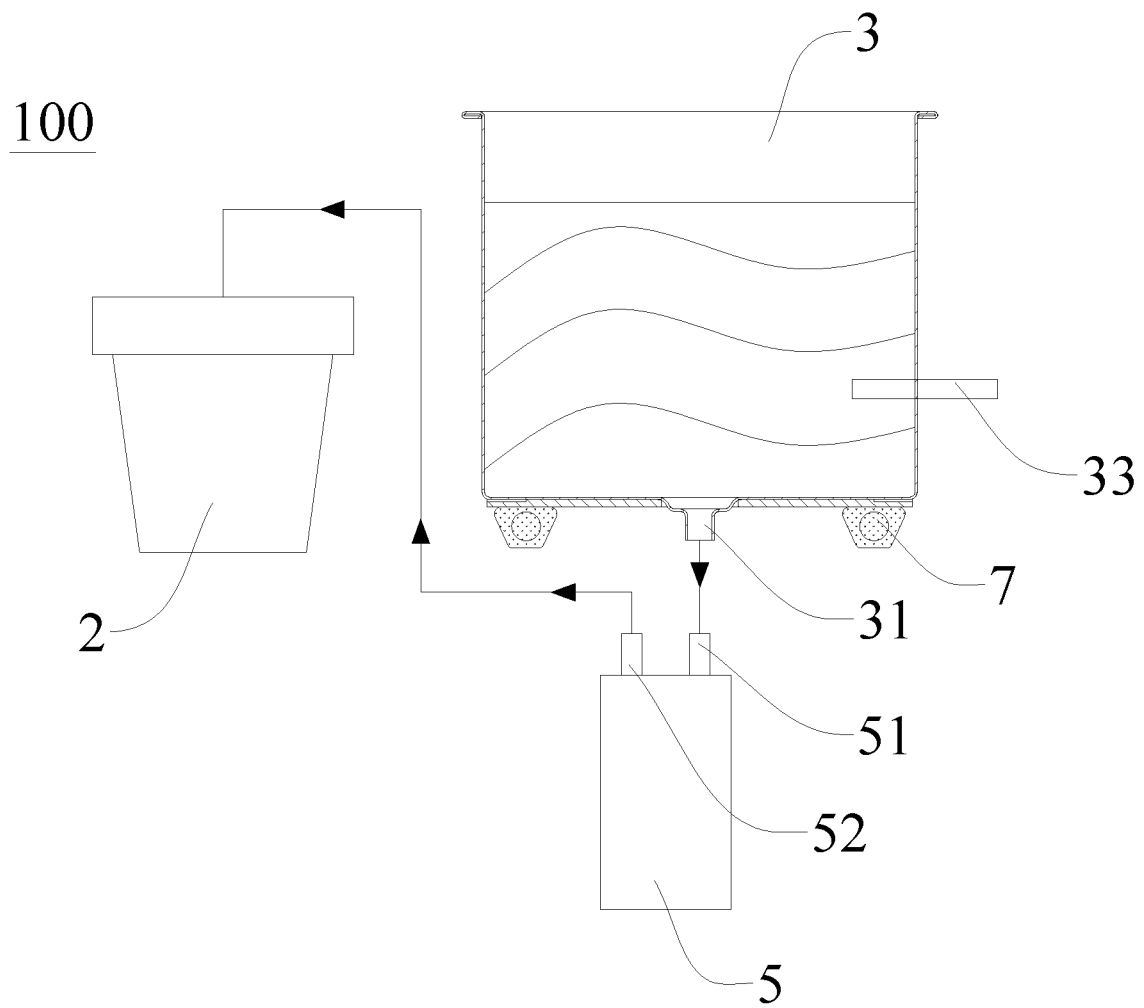
FIG. 18 is a schematic view of a beverage machine according to embodiments of the present disclosure.

Specifically, referring to FIG. 16, the heating device 7, like the heating tube, is located inside an outer edge of the bottom of the boiler 3, and a distance F between an outer edge of the heating device 7 and the outer edge of the bottom of the boiler 3 satisfies 2 mm≤F≤3 mm. In some embodiments, F further satisfies F=2.5 mm. Thus, the uniformity of heating the boiler 3 can be improved, and the heating device 7 can be kept at a safe distance from an inner wall of the frame 4, thereby improving the safety of the boiler 3.

Optionally, the boiler 3 is provided with a fuse 37 and/or a snap-action thermostat 38, to offer temperature protection. That is, the boiler 3 can be provided with either of the fuse 37 and the snap-action thermostat 38, or the boiler 3 can be provided with both of the fuse 37 and the snap-action thermostat 38. For instance, in an example of FIG. 17, a bottom wall of the boiler 3 is provided with the fuse 37 and the snap-action thermostat 38 simultaneously, so as to enhance the safety of the boiler 3, prolong service life of the boiler 3, and reduce the cost of using the beverage machine 100.

Figure 15:
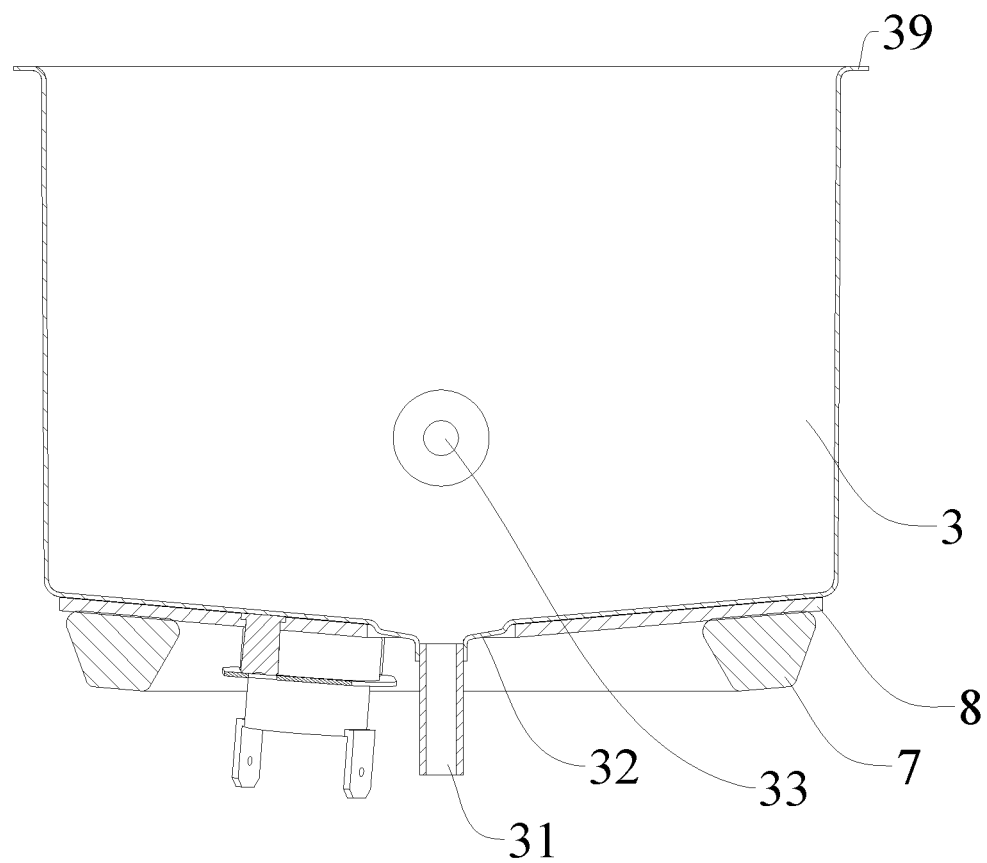
FIG. 15 is a sectional view of the boiler in FIG. 14.

Optionally, referring to FIGS. 15 and 16, the bottom wall of the boiler 3 is configured to obliquely and downwardly extend in a direction of facing the first liquid outlet 31. Specifically, an inclination angle α of the bottom wall of the boiler 3 with respect to the upper surface of the boiler 3 satisfies 5°≤α≤10°. In some embodiments, a further satisfies α=5°. Hence, the liquid in the boiler 3 can flow out of the boiler 3 along the inclination angle of the bottom wall of the boiler 3, avoiding any liquid residue in the boiler 3, and the structure is simple and easy to process.

Further, a portion of the bottom wall of the boiler 3 adjacent to the first liquid outlet 31 is recessed downwards to define a recessed groove 32. Specifically, a bottom wall of the recessed groove 32 is configured to obliquely and downwardly extend in the direction of facing the first liquid outlet 31. Thus, the liquid in the boiler 3 can flow out more conveniently, further avoiding any liquid residue in the boiler 3.

Figure 14:
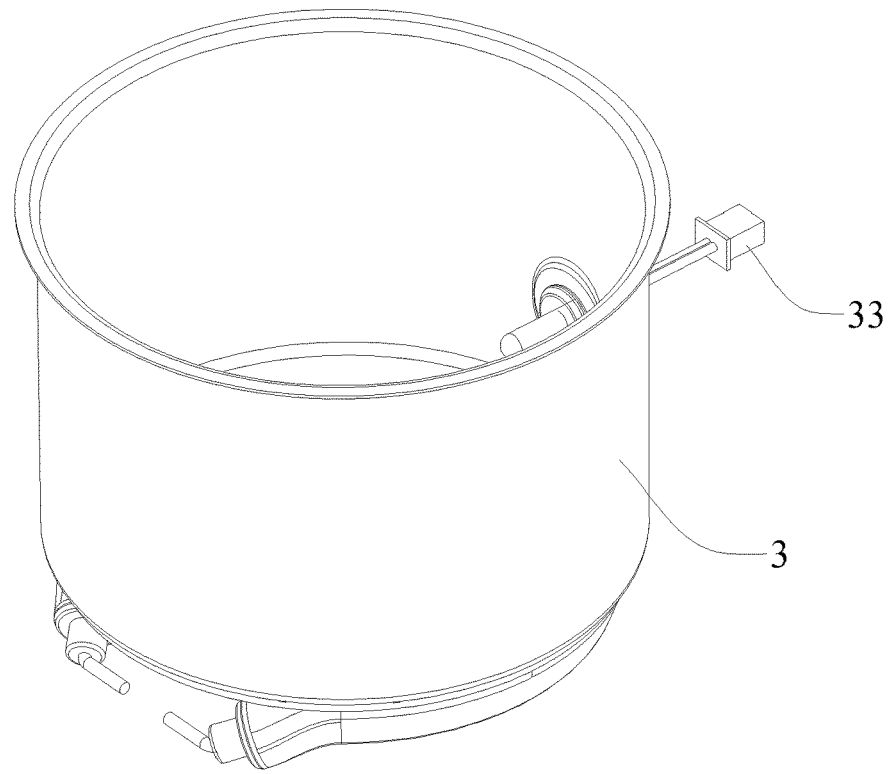
FIG. 14 is a perspective view of the boiler in FIG. 3.

According to some embodiments of the present disclosure, a thermistor 33 is provided to a side of the boiler 3. Referring to FIGS. 14 and 16, the thermistor 33 is located at a lower portion of the boiler 3 and has an end stretching into the boiler 3. The thermistor 33 is optionally disposed horizontally. Thus, the temperature of the liquid (like water) in the boiler 3 can be detected accurately, thereby improving the taste of the beverage.

Specifically, an inner wall of the boiler 3 has a first water level line 35 higher than the thermistor 33. Optionally, a distance between the first water level line 35 and an upper end face of the boiler 3 is E, and for example, referring to FIG. 16, the distance E between the first water level line 35 and the upper end face of the boiler 3 satisfies 10 mm≤E≤20 mm. A specific value of the distance E can be determined in the light of practical requirements. Thus, it is possible to prevent the liquid in the boiler 3 from splashing out, thereby enhancing the safety of the boiler 3.

Optionally, the inner wall of the boiler 3 can also be provided with a second water level line 36, in which the first water level line 35 is higher than the second water level line 36. For example, the first water level line 35 can be a maximum water level line, while the second water level line 36 can be a minimum water level line. The thermistor 33 is optionally located below the minimum water level line. Thus, it is ensured that the thermistor 33 is always located below the liquid level when different amounts of water are added in, thereby further improving accuracy of temperature measurement of the thermistor 33.

According to some embodiments of the present disclosure, referring to FIG. 16, a distance J between a central axis of the thermistor 33 and the outer edge of the bottom of the boiler 3 satisfies 10 mm≤J≤20 mm. A specific value of the distance J can be determined in the light of practical requirements. For example, J can further satisfy J=18 mm. Thus, the measurement accuracy of the thermistor 33 can be increased, to make the temperature of the liquid in the boiler 3 reach a brewing requirement, thereby further improving the taste of the beverage.

Further, the boiler 3 is provided with a mounting hole adapted to be passed through by the above end of the thermistor 33, and a first seal ring 34 is provided between the thermistor 33 and the mounting hole. Thus, it is possible to improve sealing performance at the mounting hole and prevent water leakage.

According to some embodiments of the present disclosure, an inner wall of the accommodating cavity 43 defines a limiting groove 44 for accommodating the thermistor 33. Referring to FIG. 4, the limiting groove 44 can be formed by recessing a portion of the inner wall of the accommodating cavity 43 towards a direction away from a center of the accommodating cavity 43, the limiting groove 44 extends along an up-and-down direction, and the limiting groove 44 penetrates an upper end face of the first frame 41. For example, when the boiler 3 is assembled, the thermistor 33 and the limiting groove 44 can be first aligned in the up-and-down direction, and then the boiler 3 is moved downwards, such that the turn-up 39 of the boiler 3 is supported on the frame turn-up 431. Thus, the assembly of the boiler 3 is convenient, and the position of the boiler 3 becomes more stable by positioning the boiler 3 through the limiting groove 44.

According to some embodiments of the present disclosure, a cross-sectional area of a periphery of the second frame 42 is larger than a cross-sectional area of a periphery of the first frame 41, to form a step 45 between the first frame 41 and the second frame 42. For example, referring to FIGS. 3 and 4, a cross section of the frame 4 is circular, an outer diameter of the second frame 42 is larger than an outer diameter of the first frame 41, and the step 45 is constituted between the first frame 41 and the second frame 42. Thus, the structural strength of the frame 4 can be effectively enhanced to prevent deformation of the frame 4.

Optionally, a cross section of the boiler 3 is circular, an outer diameter of the boiler 3 is R, a height of the boiler 3 is h, and a ratio relationship between h and R is $0.5 \leq h/R \leq 0.88$. Thus, the structural strength of the boiler 3 can be effectively enhanced, such that the boiler 3 is not easy to deform and damage, thereby prolonging the service life of the boiler 3 and reducing the cost of using the boiler 3; and the utilization rate of materials can be maximized, thereby saving materials and lowering material costs of the boiler 3. Additionally, the boiler 3 can be conveniently assembled to the frame 4, and internal space of the frame 4 can be fully utilized to reduce a volume of the frame 4, thereby reducing an overall volume of the beverage machine 100.

According to some embodiments of the present disclosure, R further satisfies $80 \text{ mm} \leq R \leq 100 \text{ mm}$, and h further satisfies $50 \text{ mm} \leq h \leq 70 \text{ mm}$. Specific values of R and h can be determined in the light of practical requirements. For example, R can further satisfy R=91 mm, and h can further satisfy h=60 mm. Thus, the structural strength of the boiler 3 can be significantly enhanced, the service life of the boiler 3 can be prolonged, and the volume of the boiler 3 can be relatively reduced, so as to reduce the volume of the beverage machine 100 effectively, save materials and lower the material costs; and the process is convenient and the appearance is aesthetic.

Certainly, it could be understood that the cross sections of the frame 4 and the boiler 3 can have other shapes, such as rectangles, ovals and so on, which will not be specifically defined herein.

Specifically, the bottom of the boiler 3 stretches downwardly into the second frame 42. For example, referring to FIG. 5, a distance B between an edge of the bottom of the boiler 3 and a bottom surface of the step 45 satisfies $B \geq 7$ mm. A specific value of the distance B can be determined in the light of practical requirements. For example, B can further satisfy B=9 mm. Thus, the step 45 can be kept at a certain distance from the heating device 7 (such as the heat radiating tube or the heating tube) on the bottom surface of the boiler 3, such that the step 45 is far away from the heating portion, and the heating device 7 maintains a safe distance from the frame 4, thereby playing a safe role of fire prevention, and enhancing the safety of the beverage machine 100. Additionally, the requirement for the material of the frame 4 is lowered, and for example, the safety of the beverage machine 100 can also be guaranteed without need for a fireproof material and a high temperature resistant material, thereby reducing the material costs of the frame 4.

Figure 8:
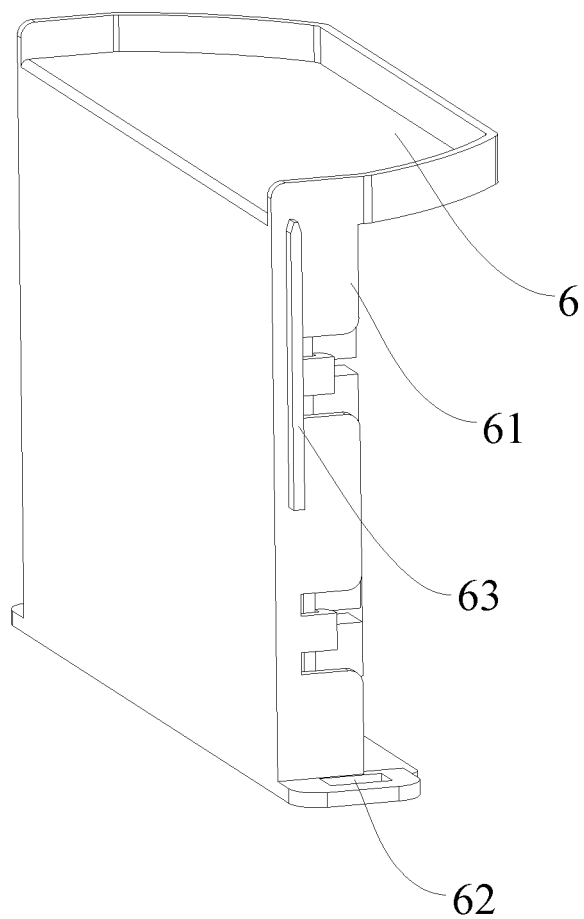
FIG. 8 is a perspective view of the power supply board in FIG. 4.

Further, a retaining rib 61 is provided to a side of the power supply board 6. Referring to FIG. 8, the retaining rib 61 extends along the up-and-down direction, such that electrical elements on the power supply board 6 can be spaced apart from the frame 4 to play the role of fire prevention, thereby further enhancing the safety of the beverage machine 100.

According to some embodiments of the present disclosure, the power supply board 6 is connected to the second frame 42 through at least one snap structure. The power supply board 6 can be connected to the second frame 42 through one snap structure, or can be connected to the second frame 42 through a plurality of snap structures.

Specifically, each snap structure includes the snap 46 and a snapping groove 62. The snap 46 is provided to a bottom of the second frame 42 and extends downwards; the snapping groove 62 is provided in a bottom surface of the power supply board 6; the snap 46 is fitted with the snapping groove 62 to connect the power supply board 6 to the second frame 42. For example, referring to FIGS. 6 and 8, two snaps 46 are spaced apart and provided to two radially opposite sides of the bottom of the second frame 42; correspondingly, two snapping grooves 62 are spaced apart and provided to two ends, in a length direction, of the bottom surface of the power supply board 6; two snaps 46 stretch into corresponding snapping grooves 62 to enable the positioning of the power supply board 6 in the up-and-down direction, such that the power supply board 6 can be connected to the second frame 42 conveniently and firmly, and the structure is simple and convenient to assemble.

Further, one of the second frame 42 and the power supply board 6 is provided with a positioning rib 63, and the other one of the second frame 42 and the power supply board 6 is provided with a positioning groove 421 fitted with the positioning rib 63. That is, when the second frame 42 is provided with the positioning rib 63, the power supply board 6 is provided with the positioning groove 421 fitted with the positioning rib 63; when the power supply board 6 is provided with the positioning rib 63, the second frame 42 is provided with the positioning groove 421 fitted with the positioning rib 63. The fitting between the positioning groove 421 and the positioning rib 63 enables the positioning of the power supply board 6 in a front-and-rear direction.

Figure 7:
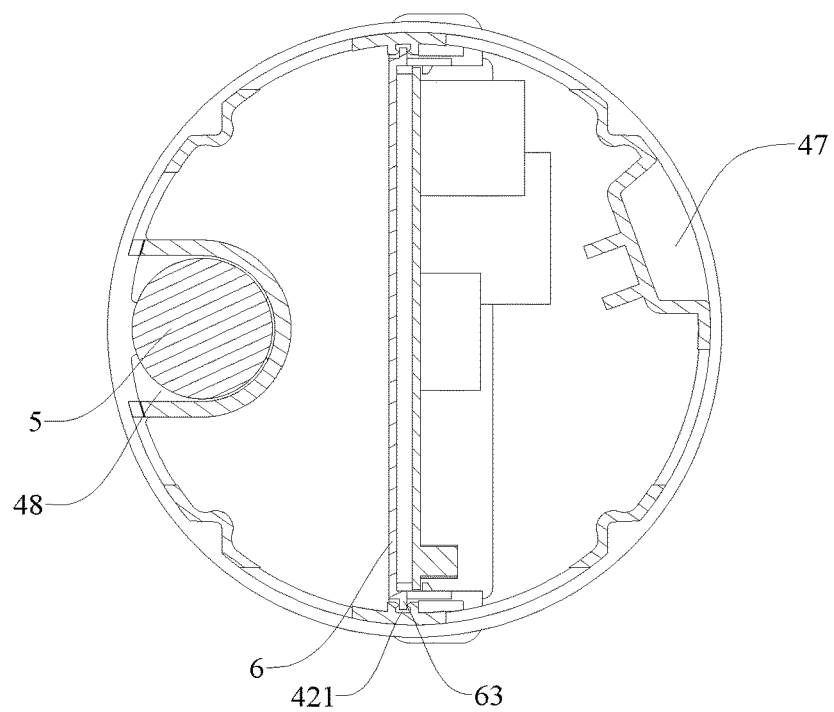
FIG. 7 is another sectional view of the frame, the boiler, the liquid pump and the power supply board in FIG. 4.

Referring to FIGS. 4 and 7, the power supply board 6 is provided with the positioning rib 63, and the second frame 42 is provided with the positioning groove 421. The positioning rib 63 can be disposed to the retaining rib 61, and the positioning rib 63 extends along a vertical direction and forms a protrusion extending away from the retaining rib 61. When assembled, the power supply board 6 can be moved from the bottom up relative to the second frame 42, such that the positioning rib 63 is fitted with the positioning groove 421 and the snap 46 is fitted with the snapping groove 62. Thus, the power supply board 6 can be positioned in the up-and-down direction while positioned in the horizontal direction, and the connection is stable; the difficulty of assembling the power supply board 6 can be reduced effectively to improve assembly efficiency.

According to some embodiments of the present disclosure, an outer peripheral wall of the second frame 42 defines a recess 48 recessed inwards, and the liquid pump 5 is configured to be placed in the recess 48. Further, the recess 48 is provided with a limiting portion 481. Referring to FIG. 4, the limiting portion 481 is formed at a side of the second frame 42 away from a center of the second frame 42. Hence, the liquid pump 5 can be confined in the recess 48 and the position of the liquid pump 5 becomes more stable.

Further, the frame 4 is provided with a fixing structure 47 (e.g. a bobbin winder) configured to fix a power cord. For example, referring to FIGS. 6 and 7, the fixing structure 47 is formed at a bottom surface of the frame 4, such that the power cord can be stored by the fixing structure 47 conveniently, thereby reducing a space occupied by the power cord and decreasing the overall volume of the frame 4. Additionally, the overall structure of the frame 4 can be neater by providing the fixing structure 47.

According to some embodiments of the present disclosure, referring to FIG. 5, a minimum distance C between the heating device 7 at the bottom of the boiler 3 and the power supply board 6 satisfies 20 mm≤C≤35 mm. In some embodiments, C further satisfies C=30 mm. Thus, the power supply board 6 can be kept at a safe distance from the heating device 7 to achieve a purpose of fire prevention, so as to further improve the safety of the beverage machine 100.

Figure 10:
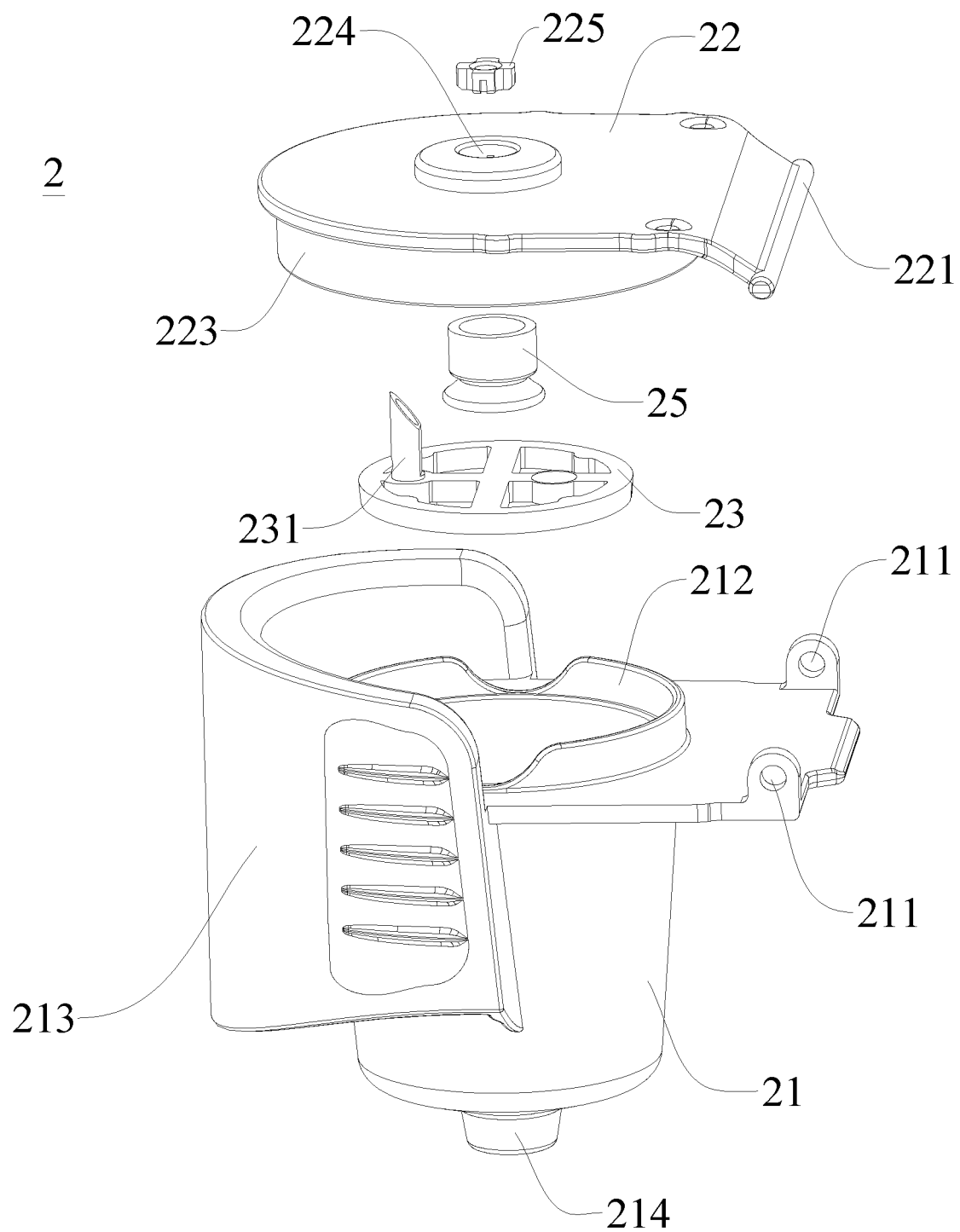
FIG. 10 is an exploded view of a brewing mechanism in FIG. 3.
Figure 11:
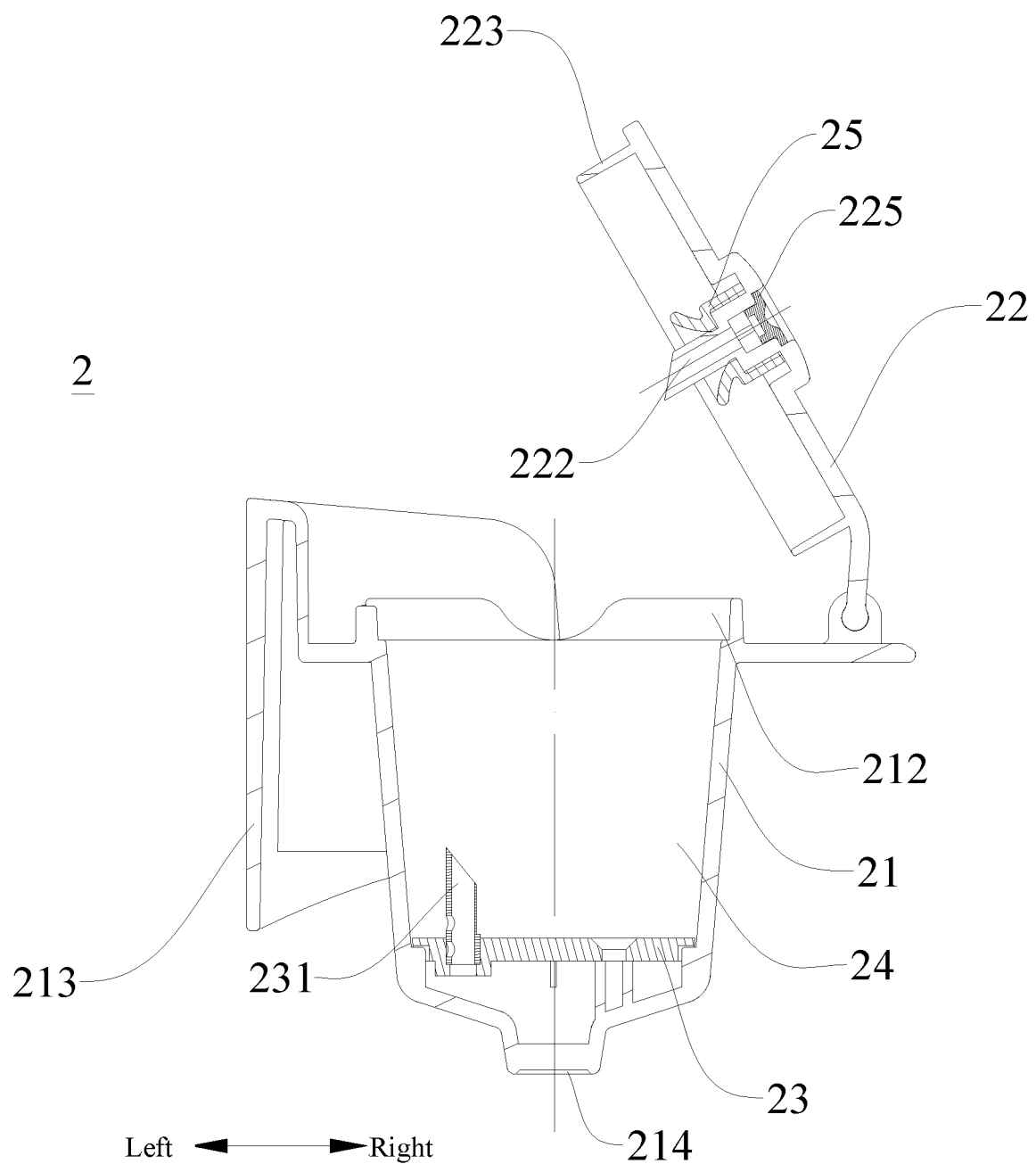
FIG. 11 is a sectional view of the brewing mechanism in FIG. 10.

According to some embodiments of the present disclosure, referring to FIGS. 10 and 11, the brewing mechanism 2 includes a brewing body 21, a needle disc 23 and a brewing cover 22. The brewing body 21 has an open top, and the needle disc 23 is disposed to a lower portion in the brewing body 21 and is provided with a first piercing needle 231.

Figure 12:
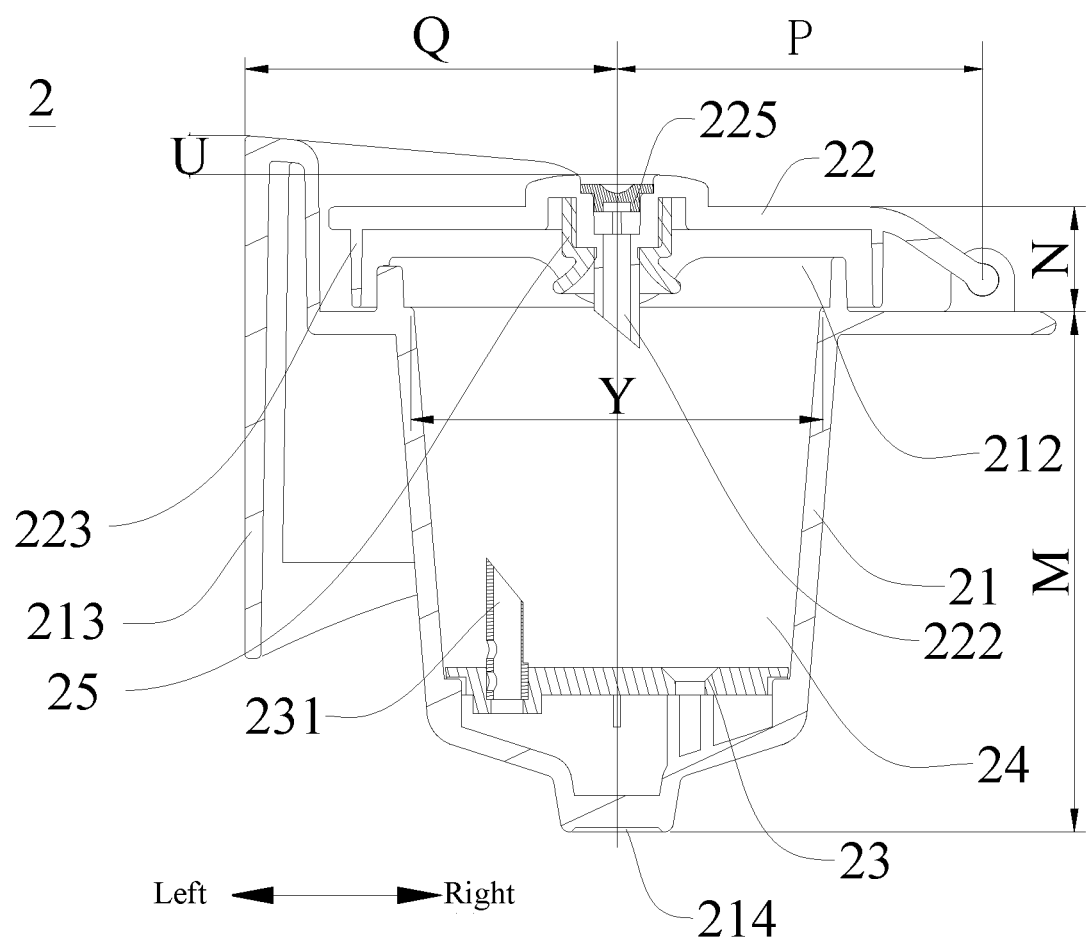
FIG. 12 is another sectional view of the brewing mechanism in FIG. 10.
Figure 13:
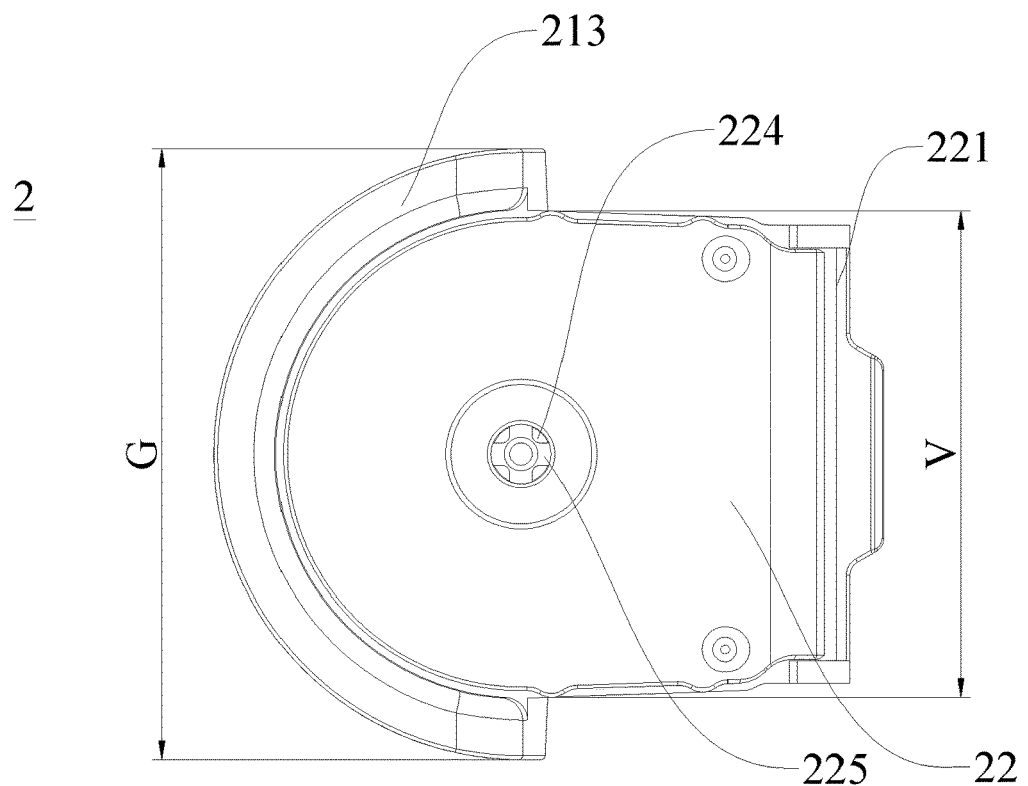
FIG. 13 is a top view of the brewing mechanism in FIG. 10.

Referring to FIGS. 10-12, the needle disc 23 extends horizontally, and the first piercing needle 231 is hollow and vertically disposed to the needle disc 23. The needle disc 23 can be detachably disposed in the brewing body 21. Optionally, the first piercing needle 231 and the needle disc 23 are integrally molded, the process is simple and has low cost.

The brewing cover 22 is pivotably disposed to the top of the brewing body 21, and for instance, in an example of FIG. 10, the brewing cover 22 is pivotably disposed to the brewing body 21 through a second pivot shaft 221. A first end (e.g. a right end in FIG. 10) of the brewing cover 22 can be provided with a pivot shaft, and correspondingly, the brewing body 21 can be provided with a second pivot hole 221 fitted with the pivot shaft; a second end (e.g. a left end in FIG. 10) of the brewing cover 22 can open or close the brewing body 21 cooperatively.

The brewing cover 22 is provided with a second piercing needle 222, and the brewing cavity 24 is defined between the brewing cover 22 and the brewing body 21. For instance, in an example of FIG. 12, the second piercing needle 222 extends vertically downwards from a center of a top wall of the brewing cover 22.

The first piercing needle 231 and the second piercing needle 222 are each formed as a hollow structure, and an upper end face of the first piercing needle 231 and a lower end face of the second piercing needle 222 are separately formed as a slope extending obliquely from up to down. Hence, the first piercing needle 231 and the second piercing needle 222 can conveniently pierce the bottom and top of the coffee capsule respectively, and the liquid (e.g. water) can enter the coffee capsule through the second piercing needle 222, and flow out through the first piercing needle 231 after mixed with coffee powders in the coffee capsule.

Specifically, referring to FIG. 12, a distance between an upper surface of the brewing body 21 and a bottom of the brewing body 21 is M, a diameter of a cup rim of the brewing body 21 is Y, and a ratio relationship between M and Y is 0.91≤M/Y≤1.56. That is, a ratio relationship between a height M of the brewing body 21 and the diameter Y of a cross section of an upper end face of the brewing cavity 24 satisfies 0.91≤E/Y≤1.56. Thus, the height of the brewing body 21 and the diameter of the cup rim of the brewing body 21 can be determined reasonably; since the brewing mechanism 2 needs frequent disassembly and assembly, the strength of the brewing mechanism 2 can be enhanced greatly if the ratio relationship between E and Y is determined reasonably. Therefore, during the use, the brewing mechanism 2 is not easy to deform and damage, so as to prolong the service life of the beverage machine 100 and reduce the cost of using the beverage machine 100.

According to some embodiments of the present disclosure, the distance M between the upper surface of the brewing body 21 and the bottom of the brewing body 21 satisfies 55 mm≤M≤70 mm, and the diameter Y of the cup rim of the brewing body 21 satisfies 40 mm≤Y≤60 mm. Specific values of M and Y can be determined in the light of practical requirements; for example, M can further satisfy M=57 mm, and Y can further satisfy Y=50 mm. Hence, the appearance of the beverage machine 100 can look more aesthetic.

For example, when the beverage capsule, like the coffee capsule, is placed into the brewing cavity 24, the second piercing needle 222 of the brewing cover 22 and the first piercing needle 231 inside the brewing body 21 can pierce the top and bottom of the beverage capsule respectively after the brewing cover 22 is closed, such that the liquid (e.g. hot water) can flow into the beverage capsule from the second piercing needle 222 and be mixed with powders (e.g. coffee powders) in the beverage capsule, and a resulting beverage (e.g. coffee) can flow out from the first piercing needle 231. The structure is reasonable, the operation is convenient, and the dimension of the brewing body 21 is reduced to save materials. Additionally, the appearance of the beverage machine 100 is also upgraded and becomes aesthetic.

According to some other embodiments of the present disclosure, after the beverage capsule, like the coffee capsule, is placed into the brewing cavity 24, the second piercing needle 222 of the brewing cover 22 can first pierce the top of the beverage capsule, and then the first piercing needle 231 pierce the bottom of the beverage capsule.

According to some embodiments of the present disclosure, the top wall of the brewing cover 22 is provided with a first annular retaining rib 223. Referring to FIG. 10, the first annular retaining rib 223 vertically extends downwards, and a thickness of the first annular retaining rib 223 keeps constant. Thus, the liquid in the brewing cavity 24 can be prevented from splashing. Certainly, it could be understood that the first annular retaining rib 223 can obliquely extend downwards, and the thickness of the brewing cover 22 can vary. Optionally, the first annular retaining rib 223 and the brewing cover 22 are integrally molded, which is easy to process and convenient to realize.

As shown in FIG. 12, a distance N between an upper surface of the brewing cover 22 and the upper surface of the brewing body 21 satisfies 8 mm≤N≤13 mm. In some embodiments, N further satisfies N=11.5 mm. Thus, a retaining effect of the first annular retaining rib 223 can be improved, and the whole brewing mechanism 2 can become more aesthetic.

Further, the upper surface of the brewing body 21 is provided with a second annular retaining rib 212 extending upwards, and the second annular retaining rib 212 is located at an inner side of the first annular retaining rib 223. Thus, it is possible to prevent the liquid from splashing and improve the retaining effect.

According to some embodiments of the present disclosure, referring to FIG. 12, a distance P between a central axis of the pivot shaft and a central axis of the second piercing needle 222 satisfies 35 mm≤P≤45 mm. In some embodiments, P further satisfies P=40 mm. Hence, the appearance of the brewing mechanism 2 can be more aesthetic.

Optionally, a central axis of the first piercing needle 231 is offset from the central axis of the second piercing needle 222. For instance, in an example of FIG. 12, the central axis of the first piercing needle 231 is located at a left side of the central axis of the brewing body 21, while the central axis of the second piercing needle 222 coincides with the central axis of the brewing body 21, and the first piercing needle 231 is disposed eccentrically with respect to the center of the brewing body 21. Hence, it is possible to ensure that the liquid entering the beverage capsule can be fully mixed with the powders in the beverage capsule, so as to improve the taste of the beverage obtained by the beverage machine 100.

Specifically, a lower portion of the first piercing needle 231 is formed with at least one communication hole. One communication hole can be provided, or a plurality of communication holes can be provided (as shown in FIG. 12), and the communication hole is optionally located at a junction of the first piercing needle 231 and the needle disc 23, such that the liquid at the bottom of the beverage capsule (like the coffee capsule) can completely flow out, thereby further improving the taste of the beverage.

According to some embodiments of the present disclosure, the brewing cover 22 is formed with a liquid inlet 224, and the liquid inlet 224 is communicated with the liquid supply joint 26 and communicated with an interior of the second piercing needle 222. Optionally, a second seal ring 261 is provided between the liquid supply joint 26 and the liquid inlet 224 so as to enhance the sealing performance and prevent water leakage.

Further, the liquid inlet 224 is internally provided with a blocking plug 225. For example, referring to FIGS. 10 and 13, the blocking plug 225 can be formed in a cross shape, which is not limited thereto. A liquid inlet passage is defined between an inner wall of the liquid inlet 224 and the blocking plug 225, and the liquid (e.g. water) can enter the brewing mechanism 2 through the liquid inlet passage. Thus, by providing the blocking plug 225, the liquid can enter the brewing mechanism 2 through the liquid inlet passage, and the liquid and powders in the beverage capsule can be prevented from splashing out, thereby improving the safety of the beverage machine 100. Optionally, the blocking plug 225 can be but not limited to a silicone plug.

Further, a sealing member 25 is provided at the location of the second piercing needle 222, and a lower end of the sealing member 25 is configured to abut against the beverage capsule (like the coffee capsule) placed in the brewing cavity 24. Thus, the sealing performance of the brewing mechanism 2 can be enhanced to prevent the liquid and powders in the beverage capsule from splashing out, thereby further reducing the cleaning difficulty of the brewing mechanism 2.

For example, referring to FIG. 10 in combination with FIG. 12, the lower end of the sealing member 25 exhibits a flared shape. Thus, it is convenient for the lower end of the sealing member 25 to abut against an upper end face of the beverage capsule, and the structure is simple and has good sealing performance. Optionally, the sealing member 25 can be but is not limited to an elastic member.

According to some embodiments of the present disclosure, a side (e.g. a left side in FIG. 11) of the brewing body 21 is provided with a grip portion 213, and the grip portion 213 extends upwards beyond an upper end face of the brewing body 21. Thus, by providing the grip portion 213, the user can grip the brewing mechanism 2 conveniently. For example, when the user is cleaning the brewing mechanism 2, the grip portion 213 can be held by hand, so as to improve convenience of cleaning the brewing mechanism 2.

Specifically, a top of the grip portion 213 is higher than the brewing cover 22 by a distance U, and U satisfies 5 mm≤U≤10 mm. In some embodiments, U is 5 mm. Thus, the liquid can be effectively prevented from splashing, so as to further enhance the safety of the beverage machine 100. Additionally, the grip portion 213 constitutes a part of the overall appearance of the beverage machine 100, such that the whole beverage machine 100 is more aesthetic and materials are saved, thereby reducing the material cost of the beverage machine 100.

Specifically, referring to FIGS. 10 and 11, the grip portion 213 first extends upwards from an edge of the brewing body 21, then bent outwards, and extends downwards. Optionally, the grip portion 213 forms a semi-circular arc. The structure is simple and the appearance is aesthetic.

Specifically, the grip portion 213 and the brewing body 21 are integrally molded, the process is simple and has low cost.

According to some embodiments of the present disclosure, a distance Q between the central axis of the second piercing needle 222 and an outer side surface of the grip portion 213 satisfies 35 mm≤Q≤45 mm. In some embodiments, Q further satisfies Q=40 mm. A distance G between two ends of the grip portion 213 satisfies 75 mm≤G≤85 mm. In some embodiments, G further satisfies G=81 mm. Thus, the volume of the brewing mechanism 2 can be decreased, and the overall volume of the beverage machine 100 can be reduced, thereby saving the space occupied by the beverage machine 100 (like the coffee machine).

Specifically, a distance V between two ends of the brewing body 21 connected to the grip portion 213 satisfies 62 mm≤V≤70 mm. In some embodiments, V further satisfies V=65 mm. Thus, the volume of the brewing body 21 can be further reduced.

According to some embodiments of the present disclosure, referring to FIGS. 10 and 11, the bottom of the brewing body 21 is provided with a second liquid outlet 214, and can be configured to extend obliquely and downwardly in a direction of facing the second liquid outlet 214. Thus, the beverage obtained by the beverage machine 100 can flow out from the second liquid outlet 214 conveniently and be prevented from remaining in the brewing body 21.

Specifically, the machine nose 11 and the base 13 are connected to the main body 12 through the frame 4 separately. Optionally, the machine nose 11 and the base 13 can be connected to the frame 4 through screws or snaps 46. For example, referring to FIG. 3, the top of the frame 4 is provided with a first nut column 491 and the bottom of the frame 4 is provided with a second screw 492; correspondingly, the machine nose 11 can be provided with a first screw (not illustrated) fitted with the first nut column 491, and the base 13 can be provided with a second nut column 131 fitted with the second screw 492.

For example, during the assembly, the frame 4 can be connected to the base 13 first through the fitting between the second screw 492 and the second nut column 131, then the main body 12 is fitted over the frame 4, and finally, the machine nose 11 is connected to the frame 4 through the fitting between the first screw and the first nut column 491. Thus, the main body 12 can be limited between the base 13 and the machine nose 11, such that the base 13 and the main body 12 can be fastened into a whole through the frame 4, the structure is simple, and the assembly is convenient.

According to some embodiments of the present disclosure, a distance L1 between a lower end face of the brewing mechanism 2 and an upper surface of the base 13 satisfies 110 mm≤L1≤180 mm. Specifically, referring to FIG. 2, a distance between a lower end face of the second liquid outlet 214 of the brewing mechanism 2 and the upper surface of the base 13 is L1, in which a specific value of L1 can be adjusted and designed in the light of practical requirements, and for example, L1 can further satisfy L1=120 mm. Thus, the user can place a cup on the base 13 to receive the beverage.

According to some embodiments of the present disclosure, referring to FIG. 2, a distance L2 between the lower end face of the brewing mechanism 2 and the upper end face of the machine nose 11 satisfies 95 mm≤L2≤110 mm. In some embodiments, L2 further satisfies L2=100 mm. Thus, the overall volume of the beverage machine 100 can be decreased, and the appearance of the beverage machine 100 can become more aesthetic.

Specifically, the main body 12 is formed in a cylindrical shape, an outer diameter of the main body 12 is D that satisfies 125 mm≤D≤140 mm, and a specific value of D can be determined in the light of practical requirements. For example, D can further satisfy D=130 mm. Thus, the overall volume of the beverage machine 100 can be further decreased.

According to some embodiments of the present disclosure, a height H of the machine body 1 satisfies 230 mm≤H≤295 mm. In some embodiments, H further satisfies H=235 mm. Thus, the appearance of the beverage machine 100 can become more aesthetic.

Specifically, a length L3 of the machine body 1 satisfies 225 mm≤L3≤240 mm. For example, L3 can further satisfy L3=230 mm.

A brewing method for a beverage machine 100 according to embodiments of a second aspect of the present disclosure includes steps: putting a beverage capsule into a brewing cavity 24; closing a brewing cover 22 and piercing a top of the beverage capsule first by a second piercing needle 222 of the brewing cover 22; piercing a bottom of the beverage capsule by a first piercing needle 231 of a needle disc 23; pushing a brewing mechanism 2 into the beverage machine 100, and detecting, by the beverage machine 100, whether the brewing mechanism 2 is installed in place. Thus, the way of piercing is effortless, and the beverage capsule is easy to pierce; the beverage machine 100 can be started only when the brewing mechanism 2 is installed in place, thereby ensuring the safety of the beverage machine 100.

Figure 19:
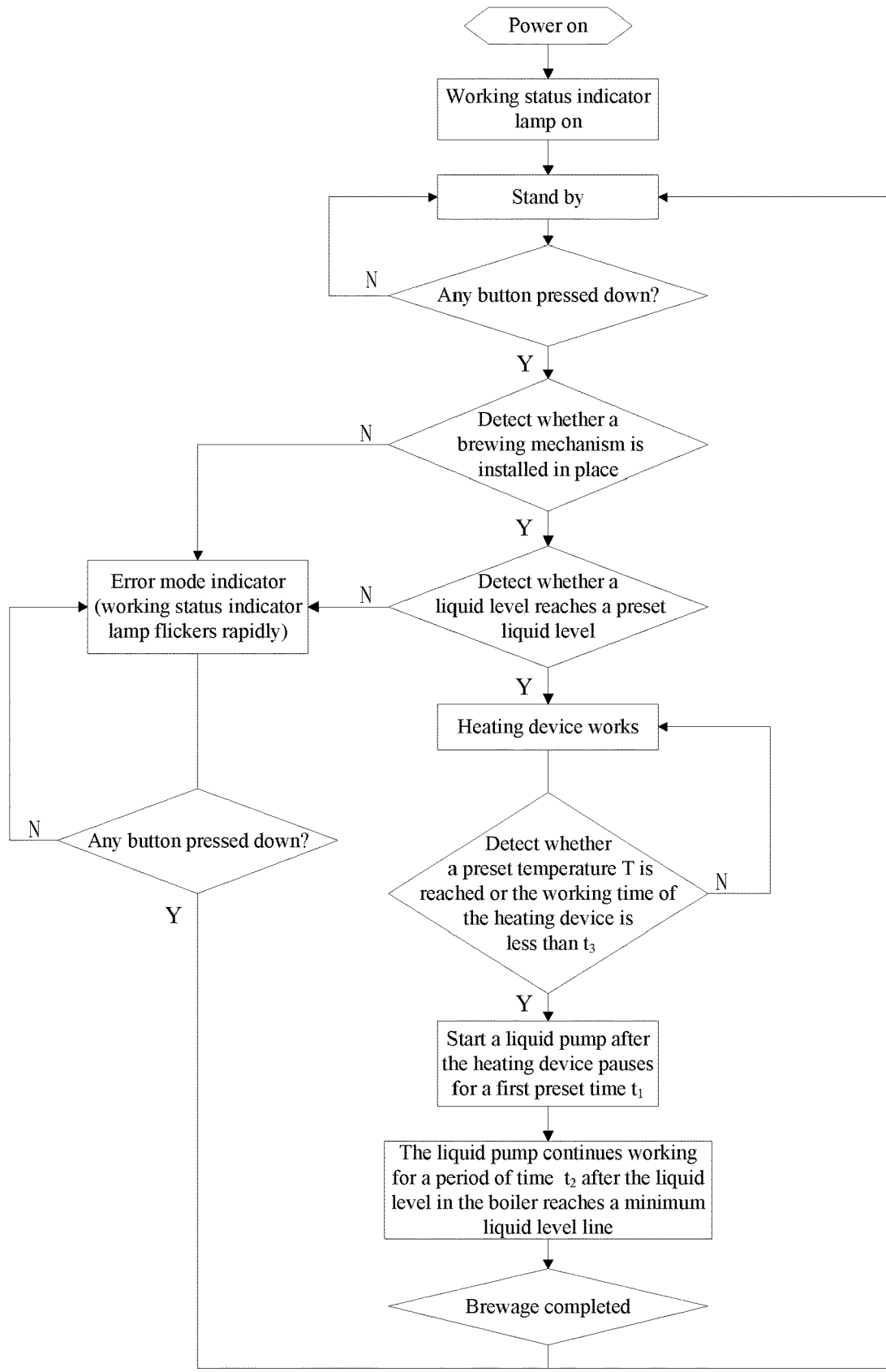
FIG. 19 is a control flow chart of a method for controlling a beverage machine according to embodiments of the present disclosure.

Referring to FIG. 19, a method for controlling a beverage machine 100 according to embodiments of a third aspect of the present disclosure includes steps: detecting whether liquid in a boiler 3 reaches a preset temperature; pumping water to a brewing cavity 24 by a liquid pump 5 when the liquid in the boiler 3 has reached the preset temperature; and keeping the liquid pump working for a period of time t2 until the end of brewing work, when a water level in the boiler 3 reaches a water level detected by a liquid level sensor. For example, after the liquid in the boiler 3 is detected to reach the preset temperature, the liquid pump 5 is started to convey the liquid (like water) in the boiler 3 to the brewing cavity 24. When the water level in the boiler 3 reaches the water level (e.g. a minimum liquid level line) detected by the liquid level sensor, the liquid pump 5 continues working for a period of time t2 until the brewing work is finished.

For example, during brewage of a beverage (like coffee), when the liquid level sensor senses that the liquid level in the boiler 1 reaches the water level (e.g. the minimum liquid level line) detected by the liquid level sensor, time counting to t2 is started. Therefore, it can be ensured that when a different amount of liquid is added into the brewing cavity 24, the time of air extraction of the liquid pump 5 keeps consistent, thereby guaranteeing that residual liquid in the brewing cavity 24 can be blow-dried and reducing the cleaning difficulty of the brewing cavity 24; additionally, residual beverage in the brewing cavity 24 can be prevented from dripping around when the brewing mechanism 2 is taken out, which otherwise may contaminate the ambient environment.

According to some embodiments of the present disclosure, t2 satisfies 20 s≤t2≤30 s. For example, t2 can further satisfy t2=30 s. Thus, it can be ensured that the residual liquid in the brewing cavity 24 is blow-dried.

Further, the boiler 3 heats the liquid in the boiler 3 through a heating device 7, such as a heat radiating tube and a heating tube. After the heating device 7 heats the liquid in the boiler 3 up to the preset temperature, the heating device 7 stops working, and after a first preset time, the liquid pump 5 is started. Specifically, the first preset time is t1, and the first preset time t1 satisfies 5 s≤t1≤10 s. In some embodiments, t1 further satisfies t1=5 s.

For example, during the beverage (e.g. coffee) brewage, the heating device 7, for example the heat radiating tube, can be first started to heat the liquid (e.g. water) in the boiler 3. When the liquid (e.g. water) in the boiler 3 reaches the preset temperature, the heating device 7 stops working, and after the first preset time, the liquid pump 5 is started. In this case, during the first preset time, remaining heat of the heating device 7 (e.g. the heat radiating tube) can be used, i.e. make use of the remaining heat of the heating device 7 to heat the liquid in the boiler 3, so as to keep the temperature of the liquid (e.g. water) stable, thus making a temperature for the beverage brewage stable, and ensuring the taste of the beverage (like coffee). Additionally, energy is greatly saved, thereby avoiding energy waste.

The preset temperature is T, and T satisfies 80° C.≤T≤90° C. For example, the temperature of the liquid in the boiler 3 can be monitored by a thermistor 33 on the boiler 3. Thus, it is possible to improve the taste of the beverage and satisfy the user's requirement for the quality of the beverage.

According to some embodiments of the present disclosure, the working time of the heating device 7 is t3, and t3 satisfies t3≤120 s. In this case, a timer can be provided in the beverage machine 100, and when the thermistor 33 or other temperature measurers fails or produces a large error, it is possible to avoid overheating the boiler 3 by means of the timer, so as to shorten the entire time for the beverage brewage. Additionally, the safety hazard is further reduced, and the safety of the beverage machine 100 is enhanced.

According to some embodiments of the present disclosure, the method for controlling the beverage machine 100 further includes the following steps: controlling the beverage machine 100 to be powered off when the liquid in the boiler 3 reaches the preset temperature T; or controlling the beverage machine 100 to be powered off by means of a snap-action thermostat 38, when the thermistor 33 fails and the temperature of the boiler 3 reaches a temperature point of the snap-action thermostat 38; or controlling the beverage machine 100 to be powered off, when the thermistor 33 and the snap-action thermostat 38 both fail, and the timer starts counting from the time of heating and counts to t5. Therefore, the beverage machine 100 can be triply protected by the thermistor 33, the snap-action thermostat 38 and the timer, thereby reducing the safety hazard and guaranteeing the operation safety of the beverage machine 100 considerably.

Specifically, t5 satisfies 120 s≤t5≤180 s. Thus, it is possible to lower the safety hazard and improve the safety of the beverage machine 100.

Further, before the step of starting the heating device 7, the method also includes: detecting whether the liquid level in the boiler 3 reaches a preset liquid level. For example, the liquid level in the boiler 3 can be detected by the liquid level sensor (e.g. a liquid level sensing rod). Thus, it is convenient to monitor whether the liquid in the boiler 3 meets the requirements for brewing the beverage, thereby effectively improving the taste of the beverage.

According to some embodiments of the present disclosure, before the step of starting the heating device 7, the method also includes: detecting whether the brewing mechanism 2 is installed in place. It is preferable to detect whether the liquid level in the boiler 3 reaches the preset liquid level after detecting whether the brewing mechanism 2 is installed in place.

Further, the beverage machine 100 further includes a working status indicator lamp (not illustrated), and when the beverage machine 100 is in an abnormal status, the working status indicator lamp flickers rapidly. It should be noted herein that "the abnormal status" in the present application means the brewing mechanism 2 is not installed in place or the liquid level in the boiler 3 does not reach the preset liquid level.

For example, when the liquid level in the boiler 3 does not reach the preset liquid level line, the working status indicator lamp can be set to flicker rapidly, for example regularly flicker rapidly at 200 ms (milliseconds), so as to remind the user to adjust the liquid level in the boiler 3. Hence, it is convenient to monitor whether the liquid in the boiler 3 meets the requirements for brewing the beverage, thereby effectively improving the taste of the beverage.

Moreover, the brewing mechanism 2 can be provided with a safety switch 112. For example, when the brewing mechanism 2 is installed in place, the safety switch 112 can be triggered, the brewing mechanism 2 is powered on, and hence the beverage (e.g. coffee) brewage can be continued. When the brewing mechanism 2 deviates from the correct position, an error message can be provided, and for example, the working status indicator lamp can be set to regularly flicker rapidly at 200 ms (milliseconds), so as to remind the user to adjust the position of the brewing mechanism 2. Therefore, the beverage machine 100 can be prevented from working in the case where the brewing mechanism 2 is deviated, so as to reduce the safety hazard effectively and further improve the safety and reliability of the beverage machine 100.

Specifically, the time required for the liquid pump 5 to convey all the liquid in the boiler 3 to the brewing cavity 24 is t4, and t4 satisfies 35 s≤t4≤60 s. Thus, not only the liquid amount requirement of the beverage brewage can be satisfied, but also the entire time for the beverage brewage can be shortened.

A specific embodiment of the method for controlling the beverage machine 100 according to the present disclosure will be described below with reference to FIG. 19.

The method for controlling the beverage machine 100 according to the embodiment of the present disclosure includes the following steps: detecting whether a brewing mechanism 2 is installed in place; detecting whether the liquid level in the boiler 3 reaches the preset liquid level; starting the heating device 7 to heat the liquid in the boiler 3; detecting whether the liquid in the boiler 3 reaches the preset temperature or whether the working time of the heating device 7 reaches 120 s; when the liquid in the boiler 3 reaches the preset temperature or the working time of the heating device 7 reaches 120 s, stopping the heating device 7, and starting the liquid pump 5 after 5 seconds; and when the liquid level in the boiler 3 reaches the minimum liquid level line, the liquid pump 5 continues working for 30 seconds.

Specifically, during the coffee brewage, a boiler cover 113 is opened first, and the boiler cover 113 is closed after an appropriate amount of water is added into the boiler 3; then, a brewing cover 22 is opened, and after a coffee capsule is put into the brewing cavity 24, the brewing cover 22 is pressed; a second piercing needle 222 of the brewing cover 22 first pierces a top of the coffee capsule, and then a first piercing needle 231 in the brewing cavity 24 pierces a bottom of the coffee capsule; the brewing mechanism 2 is connected to a machine nose 11, and a coffee machine is connected to a power source, in which case an indicator lamp on the coffee machine is on, and the coffee machine enters a standby status.

A start switch of the beverage machine 100 is pressed; the brewing mechanism 2 is detected whether it is installed in place; when the position of the brewing mechanism 2 is wrong, the working status indicator lamp regularly flickers rapidly at 200 ms (milliseconds) to remind the user to adjust the position of the brewing mechanism 2, until the brewing mechanism 2 is installed in place; the liquid level in the boiler 3 is detected whether it reaches the preset liquid level.

When the liquid level in the boiler 3 does not reach the preset liquid level line, the working status indicator lamp regularly flickers rapidly at 200 ms (milliseconds) to remind the user to adjust the liquid level in the boiler 3, until the liquid level in the boiler 3 reaches the preset liquid level, and then the heat radiating tube is started to heat the water in the boiler 3.

When the water in the boiler 3 reaches 80° C., or the working time of the heat radiating tube reaches 90 s, the heat radiating tube stops working, and the liquid pump 5 is started after 5 seconds. After the water level in the boiler 3 reaches the minimum liquid level, the liquid pump 5 continues working for 30 seconds.

With the method for controlling the beverage machine 100 according to embodiments of the present disclosure, the remaining heat of the heating device 7 is fully utilized, thereby saving energy considerably and reducing the energy consumption of the beverage machine 100. Additionally, the safety and reliability of the beverage machine 100 is enhanced.

Reference throughout this specification to "an embodiment," "some embodiments," "an exemplary embodiment", "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, modifications, alternatives and variants can be made in the embodiments without departing from principles and scope of the present disclosure. The scope of the present disclosure is defined by the claims and the like.

What is claimed is:

1. A beverage machine, comprising:
   a machine body, comprising a machine nose, a main body, and a base, connected in sequence from top to bottom, wherein the machine nose is provided with a liquid communication path and a safety switch;

a brewing mechanism, detachably disposed to the machine nose and having a brewing cavity and a liquid supply joint in communication with the brewing cavity, wherein when the brewing mechanism is mounted to the machine nose, the liquid supply joint is communicated with the liquid communication path and the safety switch is triggered;

a frame, disposed in the main body;

a boiler, disposed to the frame, connected to the brewing cavity, and having an interior in communication with an external atmosphere and with the liquid communication path of the machine nose;

a liquid pump, disposed to the frame and connected between the boiler and the brewing cavity; and a power supply board, disposed to the frame.

2. The beverage machine according to claim 1, wherein a top of the boiler is open, and the machine nose is provided with a boiler cover, the boiler cover being located at the top of the boiler.

3. The beverage machine according to claim 1, wherein the frame further comprises:

a first frame, the boiler being supported on the first frame; and a second frame connected below the first frame, the liquid pump and the power supply board being both disposed on the second frame.

4. The beverage machine according to claim 3, wherein the first frame internally defines an accommodating cavity with an open top, a top of the boiler is provided with a turn-up extending outwards, and the boiler is disposed within the accommodating cavity and the turn-up is supported on a top of the first frame.

5. The beverage machine according to claim 4, wherein the top of the first frame is provided with a frame turn-up extending outwards, the turn-up of the boiler is supported on an upper surface of the frame turn-up, the frame turn-up extends outwards beyond the turn-up of the boiler, and a distance between an outer edge of the frame turn-up and an edge of the turn-up of the boiler is A that satisfies 8 mm≤A≤12 mm.

6. The beverage machine according to claim 4, wherein a thermistor is provided to a side of the boiler, an inner wall of the accommodating cavity defines a limiting groove for accommodating the thermistor, and the limiting groove penetrates an upper end face of the first frame.

7. The beverage machine according to claim 3, wherein a cross-sectional area of a periphery of the second frame is larger than a cross-sectional area of a periphery of the first frame, to form a step between the first frame and the second frame; a bottom of the boiler stretches downwardly into the second frame; and a distance between an edge of the bottom of the boiler and a bottom surface of the step is B that satisfies B≥7 mm.

8. The beverage machine according to claim 3, wherein the power supply board is connected to the second frame through at least one snap structure, and each snap structure comprises:

a snap provided to a bottom of the second frame and extending downwards; and a snapping groove provided in a bottom surface of the power supply board, the snap being fitted with the snapping groove to connect the power supply board to the second frame.

9. The beverage machine according to claim 8, wherein one of the second frame and the power supply board is provided with a positioning rib, and the other one of the second frame and the power supply board is provided with a positioning groove fitted with the positioning rib; and the power supply board is moved from the bottom up relative to the second frame, such that the positioning rib is fitted with the positioning groove and the snap is fitted with the snapping groove.

10. The beverage machine according to claim 1, wherein a heating device is provided to a bottom of the boiler, and a minimum distance between the heating device and the power supply board is C that satisfies 20 mm≤C≤35 mm.

11. The beverage machine according to claim 1, wherein the brewing mechanism further comprises:

a brewing body having an open top;

a needle disc disposed to a lower portion in the brewing body and provided with a first piercing needle; and a brewing cover pivotally disposed to the top of the brewing body and provided with a second piercing needle, a brewing cavity being defined between the brewing cover and the brewing body.

12. The beverage machine according to claim 11, wherein a distance between an upper surface of the brewing body and a bottom of the brewing body is M, a diameter of a cup rim of the brewing body is Y, and a ratio relationship between M and Y is 0.91≤M/Y≤1.56.

13. The beverage machine according to claim 12, wherein E satisfies 55 mm≤E≤70 mm, and Y satisfies 40 mm≤Y≤60 mm.

14. The beverage machine according to claim 11, wherein a side of the brewing body is provided with a grip portion, the grip portion extends upwards beyond an upper end face of the brewing body, and a distance between two ends of the grip portion is G that satisfies 75 mm≤G≤85 mm.

15. The beverage machine according to claim 14, wherein a distance between a central axis of the second piercing needle and an outer side surface of the grip portion is Q that satisfies 35 mm≤Q≤45 mm.

16. The beverage machine according to claim 14, wherein the brewing cover is pivotally disposed to the brewing body through a pivot shaft, and a distance between a central axis of the pivot shaft and the central axis of the second piercing needle is P that satisfies 35 mm≤P≤45 mm.

17. The beverage machine according to claim 1, wherein the boiler is provided with a first liquid outlet, a cross section of the boiler is circular, an outer diameter of the boiler is R, a height of the boiler is h, and a ratio relationship between h and R is 0.5≤h/R≤0.88.

18. The beverage machine according to claim 1, wherein the boiler is provided with a thermistor, the thermistor has an end stretching into the boiler and is disposed horizontally, and a distance between a central axis of the thermistor and an outer edge of an bottom of the boiler is J that satisfies 10 mm≤J≤20 mm.

19. The beverage machine according to claim 18, wherein an inner wall of the boiler has a first water level line higher than the thermistor.

* * * * *